(12) United States Patent
Stansloski et al.

(10) Patent No.: US 10,684,193 B2
(45) Date of Patent: *Jun. 16, 2020

(54) STRAIN BASED SYSTEMS AND METHODS FOR PERFORMANCE MEASUREMENT AND/OR MALFUNCTION DETECTION OF ROTATING MACHINERY

(71) Applicants: Mitchell Stansloski, Fort Collins, CO (US); Austin Neumeier, Fort Collins, CO (US); Grant Slinger, Fort Collins, CO (US); Cody Vanderheyden, Fort Collins, CO (US)

(72) Inventors: Mitchell Stansloski, Fort Collins, CO (US); Austin Neumeier, Fort Collins, CO (US); Grant Slinger, Fort Collins, CO (US); Cody Vanderheyden, Fort Collins, CO (US)

(73) Assignee: PIONEER ENGINEERING COMPANY, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,616

(22) Filed: Nov. 3, 2017

(65) Prior Publication Data
US 2019/0195733 A1    Jun. 27, 2019

Related U.S. Application Data

(63) Continuation-in-part of application No. 14/545,708, filed on Jun. 8, 2015, now Pat. No. 9,841,329.

(51) Int. Cl.
*G01M 13/045*    (2019.01)

(52) U.S. Cl.
CPC .................. *G01M 13/045* (2013.01)

(58) Field of Classification Search
USPC ................................ 73/774, 777
See application file for complete search history.

(56) References Cited

U.S. PATENT DOCUMENTS

| | | |
|---|---|---|
| 3,900,812 A | 8/1975 | Brewer |
| 4,027,539 A | 6/1977 | Halloran |
| 4,203,319 A | 5/1980 | Lechler |
| 4,406,169 A | 9/1983 | Ikeuchi et al. |
| 4,773,263 A * | 9/1988 | Lesage .............. E21B 12/02 175/39 |
| 4,958,125 A * | 9/1990 | Jardine .............. E21B 12/02 175/40 |
| 5,660,481 A | 8/1997 | Ide |
| 6,508,128 B2 | 1/2003 | Bode |
| 6,526,830 B2 | 3/2003 | Scholl et al. |

(Continued)

*Primary Examiner* — Clayton E. LaBalle
*Assistant Examiner* — Warren K Fenwick

(57) ABSTRACT

Performance measurement and/or malfunction detection of rotating machinery can be accomplished by using one or more strain measuring devices attached to a journal bearing housing, using the strain measuring device or devices to generate an electrically measurable output in response to a change of a force in at least part of the journal bearing housing, using a Wheatstone bridge circuit to convert the electrically measurable output to an analog electrical signal, converting the analog electrical signal to a digital electrical signal and analyzing the digital electrical signal to determine the performance of the machinery and/or existence of a malfunction in the rotating machinery.

20 Claims, 18 Drawing Sheets

(56) References Cited

U.S. PATENT DOCUMENTS

| | | | | |
|---|---|---|---|---|
| 6,766,697 B1* | 7/2004 | Perez | ............... | F16C 17/03 |
| | | | | 73/800 |
| 6,817,425 B2* | 11/2004 | Schultz | ............ | E21B 12/02 |
| | | | | 175/39 |
| 7,345,844 B2* | 3/2008 | Toffle | ............. | G11B 33/14 |
| | | | | 360/97.22 |
| 7,503,403 B2* | 3/2009 | Jogi | ................ | E21B 7/06 |
| | | | | 175/45 |
| 7,650,254 B2 | 1/2010 | Pecher et al. | | |
| 8,567,260 B2 | 10/2013 | Nishikawa et al. | | |
| 9,841,329 B2* | 12/2017 | Stansloski | ........... | G01L 1/18 |

\* cited by examiner

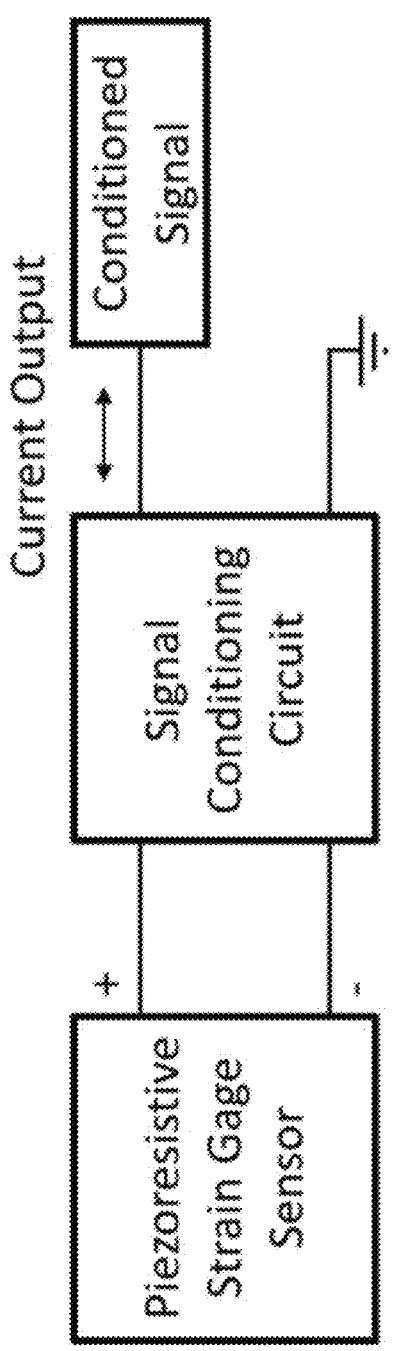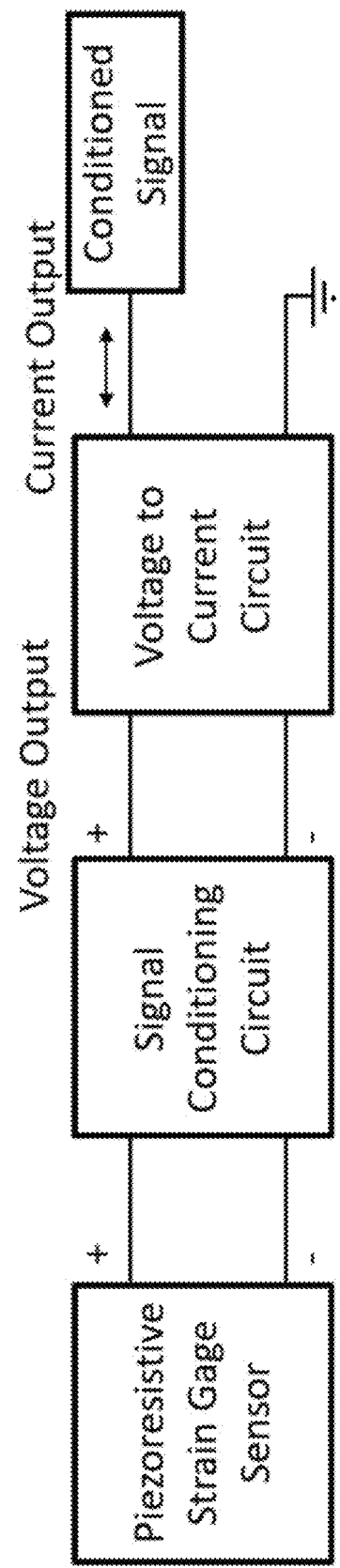
Fig. 17A
Fig. 17B

STRAIN BASED SYSTEMS AND METHODS FOR PERFORMANCE MEASUREMENT AND/OR MALFUNCTION DETECTION OF ROTATING MACHINERY

CROSS REFERENCE TO RELATED APPLICATIONS

This is a Continuation-In-Part of U.S. patent application Ser. No. 14/545,708 filed 8 Jun. 2015, the entire disclosure of which is incorporated by reference herein.

BACKGROUND

The present invention relates to rotating machinery and the measurement of strain to determine performance and/or detect malfunctions in rotating machinery. Rotating machinery can use fluid film bearings, which are also called journal bearings, hydrostatic bearings, hydrodynamic bearings, and babbitt bearings. In one embodiment, the present invention relates to systems and methods that measure strain to determine performance and/or detect malfunctions of rotating equipment that uses fluid film bearings.

Strain is a measurement of a material's change in dimension when introduced to stress. The equation for strain is: ($\delta L/L$) where $\delta L$ is the change in length in one dimension of the material from its unstrained state and L is that same unstrained length. Strain in materials is directly proportional to stress, by the equation $\sigma = E*\varepsilon$ where $\sigma$ is stress in units of pressure, E is Young's Modulus, a value unique to the material and $\varepsilon$ is the strain experienced by the material. The units of stress are in force over area, giving a direct relationship between the stress and force applied to the material. Given these three equations, strain in a material having a force applied to it can be directly related to the magnitude of the force. If this force is cyclic, as in rotating and reciprocating equipment, the strain in the material will show magnitude and frequency relatable to the force.

In rotating machinery that uses fluid film bearings, the force experienced by the shaft and bearing can be difficult to measure. The non-linear nature of the fluid in the bearing means that readings taken with an accelerometer rarely display all frequencies in the system and with incorrect magnitude ratios. Proximity probes, which monitor the position of the shaft within the bearing, may indicate issues with running conditions or the shaft itself but do not monitor the health of the rotating machinery itself. By measuring the strain experienced in and/or proximate to the bearing, direct condition monitoring is possible and shows the best possible representation of the force felt by the bearing and related components of a rotating machine during operation.

Manufacturers want to increase profit margin and decrease greenhouse gas emissions. Improvements in production equipment reliability can be a direct path towards achieving these objectives. Equipment efficiency improvement through increased reliability can directly improve the bottom line. Less evident is the impact to emissions that occurs by improperly discarding failed equipment—causing environmental waste—and then purchasing replacement machines—requiring additional energy to produce.

Machinery health monitoring, or condition monitoring, is widely considered one of the best paths towards improving equipment reliability. The customary practice in condition monitoring programs, often used to guide maintenance for large numbers of machines, is vibration acceleration readings to detect faults in machinery. For rotating and reciprocating machinery, vibration analysis methods have been developed to connect vibration signatures to specific components, faults, and operating conditions, but strain has historically not been used. The current state of the art based on vibration requires either an expensive permanent sensor installation or resources to support a portable system in which data are collected and analyzed manually. Sensor installs are often invasive and the portable collection intervals are difficult to manage at an appropriate frequency due to manpower shortage. In both cases, expert analysts must be employed for data interpretation because the current state of the art automated analysis algorithms are inaccurate at best.

Prior art automated analysis tools are inaccurate because the parameters they measure are based on the kinematics (i.e. motion), of the system. These prior art tools read the vibration displacement, velocity, or acceleration of the system, but proper analysis requires an understanding of the input forces. An analyst using measured input kinematics must infer the applied forces based on additional system parameters such as mass, stiffness, and damping. Since every system is different, the path to that inference is inconsistent, and often inaccurate.

Measuring and interpreting strain data puts the analyst much closer to measuring the actual input force. The kinematics of the system are irrelevant since measuring strain essentially bypasses these variables. Measuring strain is a "leapfrog", so to speak, over the prior art.

Interpreting strain data would significantly improve the automated analysis algorithms and therefore provide an enticement for installing more permanent monitoring systems, which collect more data with more precision than a portable temporary analysis tool. Installations of strain-based measurement tools can be less invasive and therefore more cost effective than the prior art. Wireless data transfer and localized power technology can be more easily justified with strain-based measurement tools than with the prior art tools. Wireless technology, solar energy, thermal power generation, and battery technology are all ready to be adapted to strain-based measurement applications.

Fluid film bearings are widely used. These bearings theoretically have infinite life due to their inherent lubrication. However, error during operation and maintenance can cause fluid film bearings to fail. As an example of a failure mode for a fluid film bearing, consider a main engine bearing that is provided contaminated oil containing wear particles from somewhere else in the engine. These wear particles can score the surface of the bearing, causing increased friction and distortion of the bearing geometry. The added friction can increase the oil temperature, which typically reduces oil viscosity. The deformed geometry and altered viscosity can compromise the hydrodynamic wedge, leading to a change in the pressure distribution of the fluid film bearing. Increased oil temperature can also increase the temperature of the babbitt material. The increased temperature and pressure can cause the babbitt to displace or wipe, further compromising geometry of the fluid film bearing. Eventually there is a chance that the babbitt will become so distorted that it disrupts the formation of any fluid wedge, and the shaft will crash within the fluid film bearing.

Fluid film bearing failures can be difficult to predict, especially when compared to rolling element bearings. Furthermore, successful condition monitoring of fluid film bearings can pose a much greater challenge than for rolling element bearings. Rolling element bearings typically have low internal damping, and solid paths of transmission, which allows:

(a) vibrations to reach the bearing casing linearly;
(b) accelerometers to measure the vibrations of the bearing casing; and
(c) identification of any fault signatures in the resulting accelerometer signal or signals.

For fluid film bearings, a fluid such as oil or air separates the shaft from the bearing surfaces during normal operation. This fluid film can have much higher damping properties than for rolling element bearings, which can make the system higher order, and non-linear. Therefore, case-mounted accelerometers external to the shaft can be unreliable for monitoring fluid film bearing faults because vibration of the case does not necessarily correlate to shaft vibration in a fluid film bearing. It is therefore desirable not to rely exclusively on accelerometers for fluid film bearing condition monitoring. Other technologies such as temperature trending, proximity sensing using eddy current probes, and/or the use of lasers can also be unfeasible or overly complex or costly for some fluid film bearing applications, and it is desirable not to rely exclusively on these technologies for fluid film bearing condition monitoring.

It is desired to have a more accurate, simpler, and/or lower cost system and method for monitoring fluid film dynamics and the condition of a fluid film bearing in order to improve the prognostics of devices that utilize fluid film bearings.

BRIEF DESCRIPTION OF THE DRAWINGS

The present disclosure is described in conjunction with the appended figures in which:

FIG. 17A shows a system diagram for a signal conditioning circuit which generates a current output in normal operation;

FIG. 17B shows a system diagram for a signal conditioning circuit which has a voltage output converted into a current output identical to the one in FIG. 17A.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, shapes and geometries may be shown generically and details may be left out in order not to obscure the embodiments in unnecessary detail.

Embodiments of the present invention measure strain to determine the health of rotating machinery. In these embodiments, strain measurement can be performed by one full-bridge strain sensor per channel paired with a signal conditioning circuit to generate an output electrical signal directly proportional to changes in gauge resistance resulting from strain at the strain sensor. Multiple strain sensors can be placed radially, transverse, or otherwise about a machine. Two strain sensors placed radially at 90 degrees about the shaft can be used to generate dynamic signals in isolated planes and offer a complete view of the health of the rotating machine.

The dynamic electrical signals produced by the strain sensors can then be processed in a variety of ways, including, but not limited to, spectrum analysis, time waveform analysis, even-angle analysis, etc. An X-Y plot created with these signals can be used to generate a visualization of the direction of loading in the bearing and the location of the oil wedge supporting the shaft of a fluid film bearing. This kind of plot is referred to as a 'Load Path Plot'.

The condition of a rotating machine can be monitored directly by measuring the strain experienced in a fluid film bearing. The electrical strain signal can show the best possible representation of the force felt by the bearing during operation. The non-linear nature of the fluid becomes a non-issue as the strain-based method relies on force and stress in the bearing rather than the vibration acceleration or velocity of the entire rotating machine.

Figure 13A:
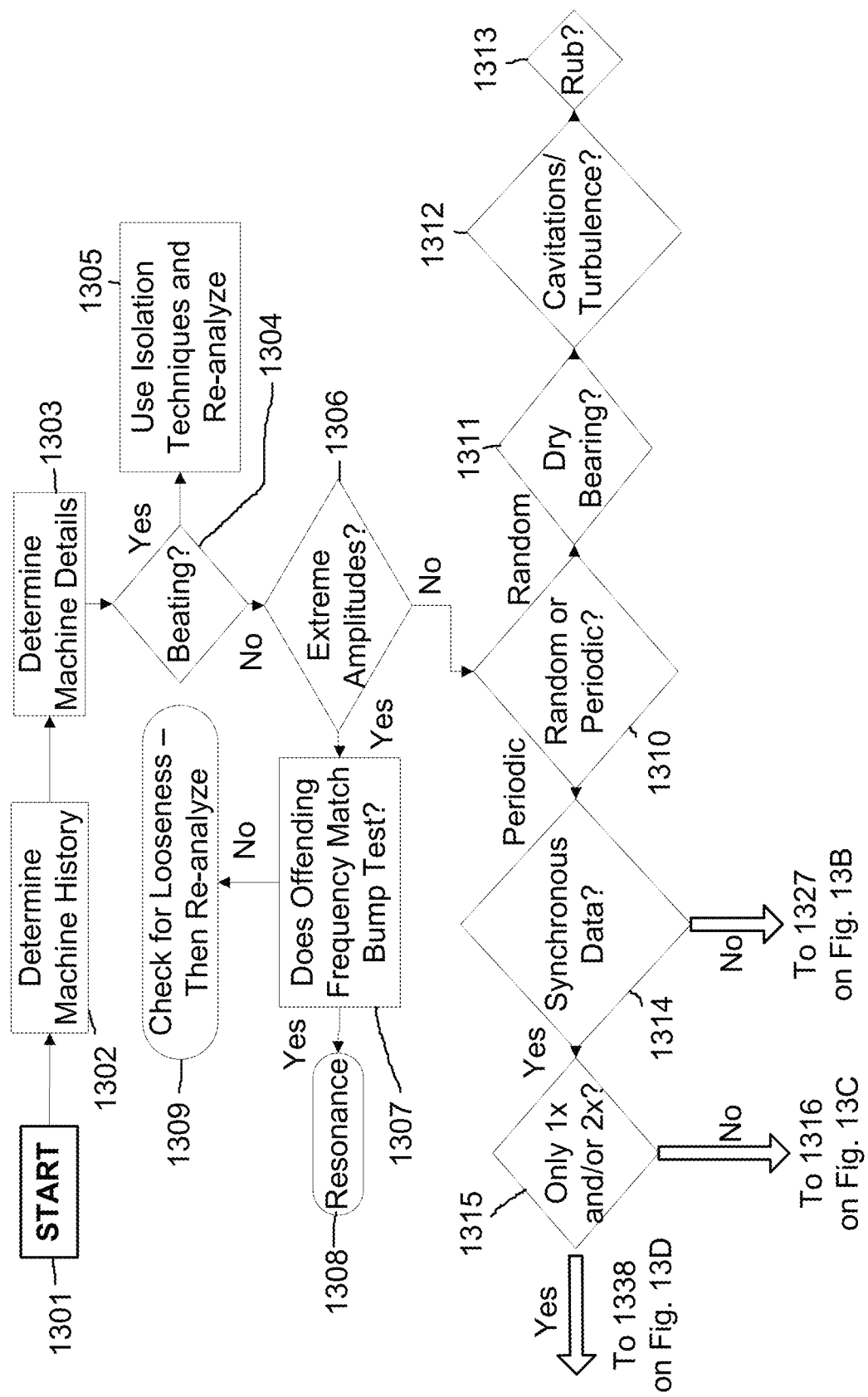
FIG. 13A shows the first steps in the process for malfunction detection of rotating equipment using signal analysis.

Embodiments of the present invention can apply concepts used in the prior art for analyzing accelerometer data (i.e. motion data) to the analysis of strain data (i.e. force data) for the detection and analysis of malfunctions in rotating machinery. FIGS. 13A, B, C and D demonstrate vibration analysis methods originally developed for monitoring rotating machinery using acceleration readings. In embodiments of the present invention, this same process can be used to identify malfunctions by using strain data.

In one embodiment, a system and method for failure detection of a fluid film bearing can comprise the measurement of strain to determine time-varying changes in the pressure of the fluid film within the bearing. Strain could be measured using a strain transducer (or transducers) located proximate to the fluid film, such as strain gages located in and/or on the babbitt or in and/or on another part of the bearing housing. Strain could be measured without using costly or expensive lasers. Time-varying signals from the strain transducers can be converted to show a relationship between frequency and amplitude. Frequencies can be analyzed to generate an alarm signal. The time-varying signals from the strain transducers can also be processed and analyzed to identify when pressures of the fluid film change, become elevated, and/or become concentrated within certain regions of the fluid film bearing.

Figure 1:
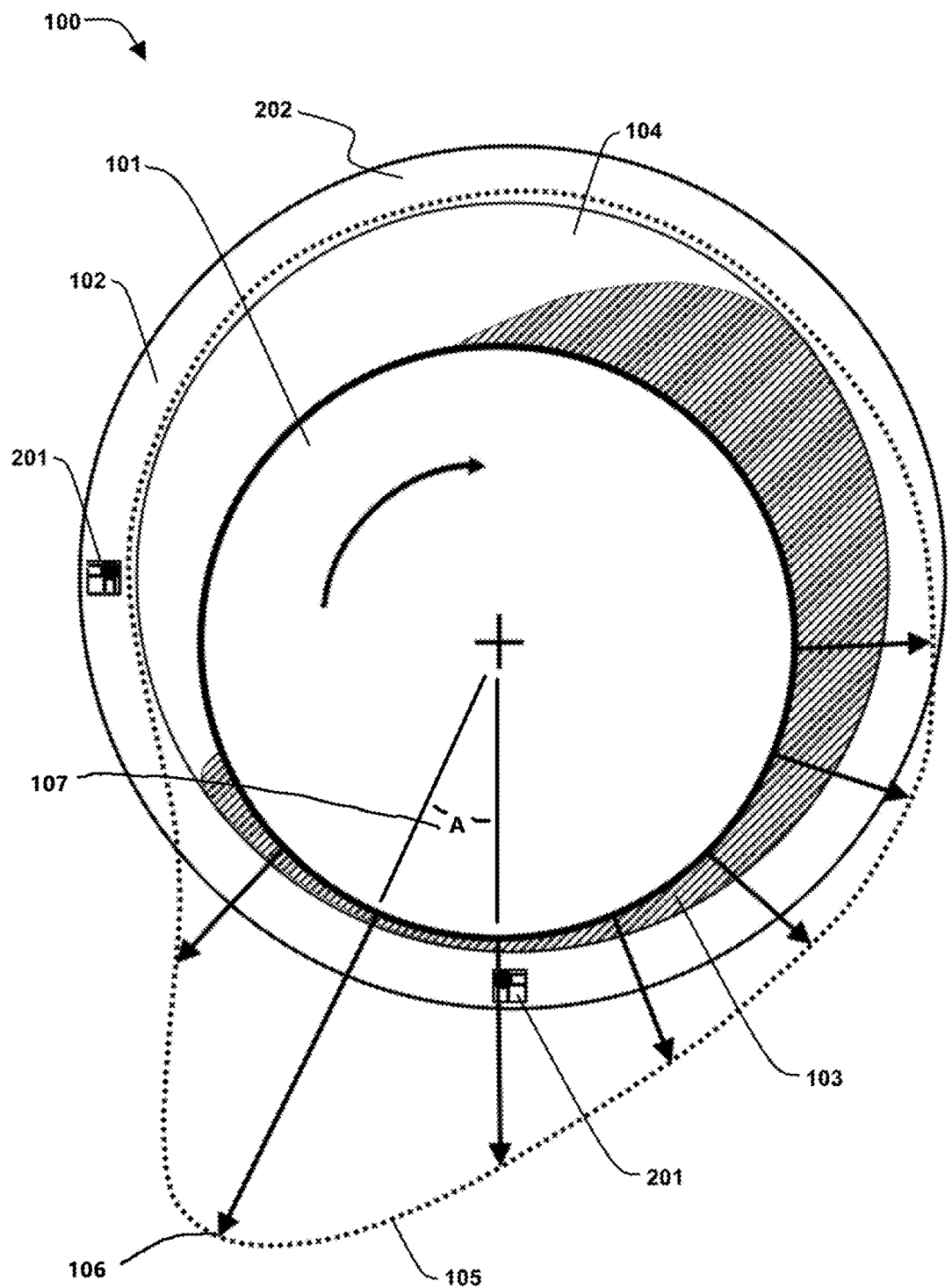
FIG. 1 shows an axial view of a shaft in a fluid film bearing to illustrate the distribution of forces in the fluid film bearing and the use of perpendicular strain gages to determine the direction of an oil wedge.

Fluid film bearing operation hinges on the formation of a high-pressure region in the fluid distribution. Typically, oil is used in industrial fluid film bearings, but other fluids, such as grease, water, or air could also be used. The fluid can be any liquid or gas having any density and viscosity capable of being understood by anyone skilled in the art. The turning shaft coupled with the fluid properties cause a distribution of pressures to form. FIG. 1 illustrates one example of this distribution and the forces present. The shaft will have a degree of eccentricity due to this distribution. This eccentricity controls the amount of stiffness and damping in the system. When bearing geometry, fluid properties, and operating loads are all perfect, the bearing will likely have infinite life. However aggravating conditions can compromise the operation of the fluid film bearing.

In embodiments of the present invention, bearing malfunctions can include any one or more of the following:

(a) Abrasion, which is defined as scraping or wearing away of a part of a bearing surface;
(b) Babbitt creep, which is defined as gradual dislocation of the Babbitt from the housing;
(c) Bearing surface imperfections, which are defined as aberrations in the smoothness of a Babbitt or the rotating shaft;
(d) Bond failure, which is defined as delamination of the bond between the Babbitt and housing;
(e) Absorbed gas blisters, which are defined as cavities caused by gases, developed in the casting process, escaping;
(f) Dissolved gas blisters, which are defined as cavities caused by gases, formed due to molten metal, which are rejecting during freezing;
(g) Blisters caused by foreign inclusions, which are defined as cavities caused by slag or dross from the melting pot during manufacturing;
(h) Blisters caused by hydrogen electroplating, which are defined as surface imperfections resulting from the steel becoming brittle due to hydrogen impurities;
(i) Blisters caused by powder impurities, which are defined as cavities caused by impurities in the metal powder during manufacturing;
(j) Brinelling, which is defined as a permanent indentation of a bearing surface;
(k) Cavitation, which is defined as boiling of the lubricant due to a reduction in pressure;
(l) Corrosion, which is defined as a breaking down of the surface of a bearing as a result of a chemical reaction;
(m) Diffusion which is defined as tin in the Babbitt layer diffusing towards the backing material;
(n) Erosion, which is defined as gradual degradation of the Babbitt;
(o) Excessive interference, which is defined as insufficient clearance between the Babbitt and the shaft;
(p) Fatigue, which is defined as displacement of the Babbitt due to excessive load and elevated temperatures;
(q) Frosting, which is defined as damage to the Babbitt from electrostatic discharge;
(r) Fretting corrosion, which is defined as degradation of the Babbitt or housing due to gradual material loss;
(s) Journal eccentricity, which is defined as excessively eccentric Babbitt and housing;

(t) Lead sweating, which is defined as the result of excessive load or shaft misalignment which causes the lead phase of those Babbitts that contain lead to "sweat" out of place;

(u) Oversized bearing, which is defined as excessive clearance between the Babbitt and shaft;

(v) Pitting, which is defined as Babbitt surface corrosion in rounded deficits;

(w) Porosity, which is defined as voids in the surface of bearing that allow the lubricating fluid to seep through the bearing surface;

(x) Scabbing, which is defined as the embedding of large dirt particles into the Babbitt;

(y) Scoring, which is defined as transverse scratching of the Babbitt or shaft by foreign particles such as dirt;

(z) Spragging, which is defined as damage found on the leading edge of an unloaded Babbitt;

(aa) Thermal cycling, which is defined as cyclic extreme temperature changes;

(bb) Thermal ratcheting, which is defined as cyclic strain on bearing components from thermal growth during thermal cycling;

(cc) A worn Babbitt, which is defined as abrasion of the malleable liner within the bearing;

(dd) Wiping, which is defined as Babbitt displacement caused by surface contact between the Babbitt and the shaft;

(ee) Wire wool, which is defined as erosion on the shaft caused by a scab on the Babbitt;

(ff) Loose Fit which is defined as an assembly error which can cause severe fretting within the bearing;

(gg) Excessive Interference is defined as an assembly error which results in excessive hoop stress causing the steel backing to yield;

(hh) Misalignment is defined as an assembly error which can cause edge loading and wear;

In embodiments of the present invention, lubrication malfunctions can include any one or more of the following:

(a) Excessive lubrication, which is defined as lubrication volume above specifications for the bearing;

(b) Inadequate lubrication, which is defined as lubrication volume below specifications for the bearing;

(c) Oil starvation, which is defined as the absence of oil or lubrication in a bearing during operation;

(d) Degradation, which is defined as oxidation of the lubricant preventing proper lubrication and oxidative protection of the bearing; and (e) Contamination, which is defined of as foreign substances in the lubricating fluid.

Referring to FIG. 1, a fluid film bearing is shown at 100. The fluid film bearing 100 comprises a rotating shaft 101, a bearing housing 102 and a fluid located in the space between the housing 102 and the shaft 101. The fluid, which can be a liquid (such as oil, grease, water, or drilling mud) or a gas (such as air), operates in two regions, a high-pressure fluid region, shown at 103, and a low-pressure fluid region, shown at 104. Fluid film bearings operation hinges on the formation of the high-pressure region 103 in part of the fluid in the space between the bearing housing 102 and the rotating shaft 101. The distribution of pressure in the film bearing is depicted by a dotted line indicating the fluid pressure profile, shown at 105. This fluid pressure profile 105 shows that the pressure is highest in the regions where the shaft 101 rotates closest to the bearing housing 102. Thus, the fluid film bearing will stabilize itself under varying radial loads—increasing loads result in a decreasing gap between the rotating shaft 101 and the bearing housing 102, resulting in a self-correcting increase in fluid film pressure which increases the ability of the fluid film bearing to sustain the applied load. The use of a viscous liquid such as oil to generate the fluid film also provides inherent damping to the fluid filled bearing.

Also shown in FIG. 1 are two strain gages 201. These strain gages measure strain in the Babbitt 202 in a radial direction. Placement at 90 degrees allows this arrangement to represent the direction and magnitude of the strain and stress in the babbitt 202. An X-Y plot generated from these strain signals can be used to indicate the direction of the oil wedge during operation as illustrated in FIG. 10C.

Figure 2A:
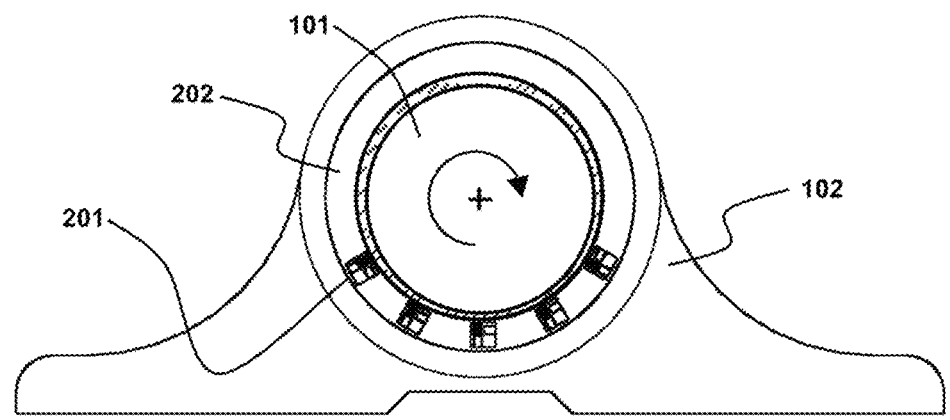
FIG. 2A and FIG. 2B show the fluid film bearing of FIG. 1 located inside a mounting block for a rotating shaft, the mounting block having strain gages mounted at a variety of data gathering points.
Figure 2B:
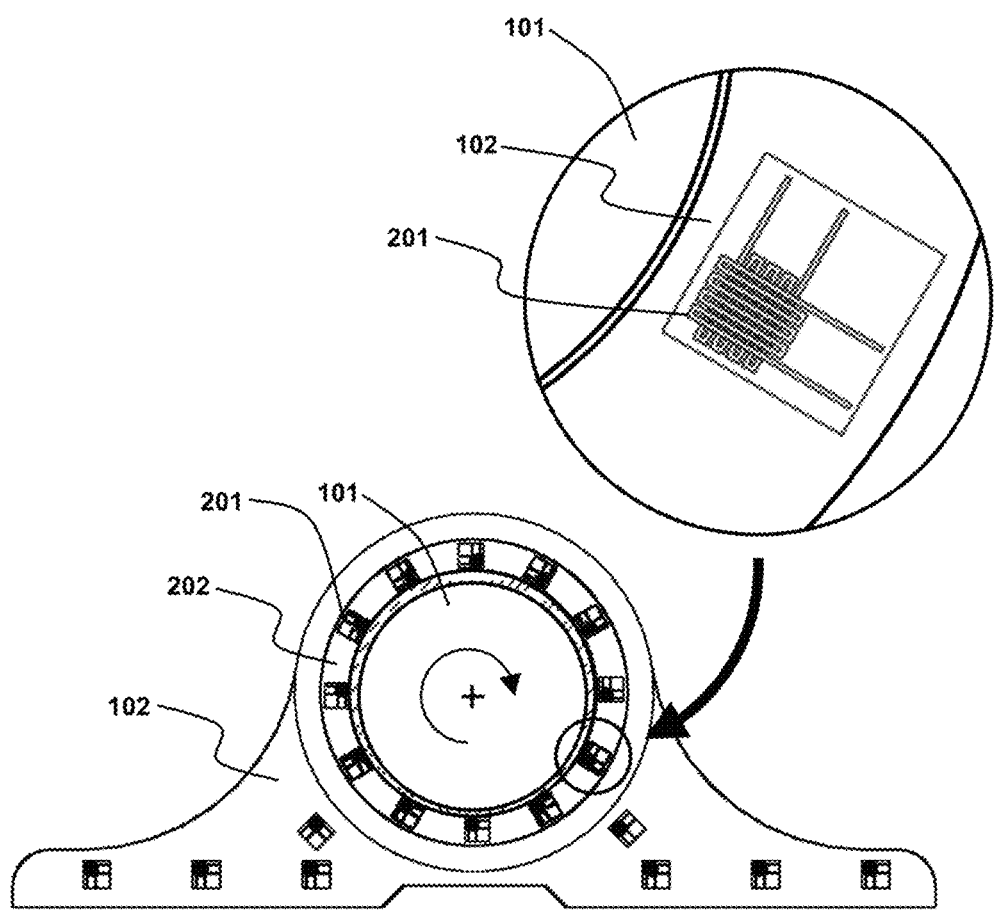

FIG. 2A and FIG. 2B show the fluid film bearing of FIG. 1, comprising the rotating shaft 101 and bearing housing 102, and further comprising one or more strain gages, shown at 201. The strain gage or gages 201 are located on a non-rotating part of the fluid film bearing proximate to the fluid film. In the embodiments shown in FIG. 2A and FIG. 2B, the strain gage or gages 201 are placed in a radial configuration on the end face of the babbitt 202. The babbitt 202 is a stationary material, typically a softer metal part of the bearing housing 102. The babbitt 202 is typically located closest to the fluid film. The strain gage or gages 201 could also be mounted in and/or on another part of the bearing housing 102. A bearing housing 102 can also be known as a pillow block or an engine block. The strain gage or gages 201 could be placed in any other location proximate to the fluid film, capable of being understood by anyone skilled in the art. FIG. 2A shows an embodiment of the present invention in which there are a plurality of strain gages 201 located on the face of the babbitt 202 in an arc near the bottom of the fluid film wherein the arc spans no more than 180 degrees and no less than 90 degrees. FIG. 2B shows an embodiment of the present invention in which there are a plurality of strain gages 201 placed at a regular spacing all the way around the face of the babbitt 202. There can be advantages to placing the strain gages on the softest, most flexible material, which is the babbitt material. Because the strain gauge is measuring a physical change in length, the most flexible material will result in the greatest change according to Hooke's Law. The strain gage or gages 201 in the embodiment shown in FIG. 2A and FIG. 2B are placed in a configuration on the babbitt material 202 so that they can measure radial strain. FIG. 2B also shows the addition of non-radial gages 201 placed at varying distances from the face of the babbitt 202. Gages 201 will measure the strain at any location applied and are not confined in operation to the babbitt 202.

Referring in more detail to the strain gage or gages 201 shown in FIG. 2A and FIG. 2B, the strain gage or gages 201 can be of several different transducer forms. All strain transducers are designed to convert a change in length of the measured surface into an electrical signal. This can be through a change in resistance, capacitance, inductance or piezoelectric effect of the transducer that is proportional to the observed strain. The most common strain transducer, depicted in FIG. 2A and FIG. 2B, is a metallic foil type strain gage 201 which consists of a fine grid of metallic wire (a resistor) which is bonded directly to the strained surface through adhesion, welding, or is cast into place. Strain gage foil material is selected to match temperature response between target material and the foil to minimize thermal strain. Common metallic foil materials and their respective gage factors include but are not limited to:

| Material | Gage Factor |
| --- | --- |
| Platinum (Pt 100%) | 6.1 |
| Platinum-Iridium (Pt 95%, Ir 5%) | 5.1 |
| Platinum-Tungsten (Pt 92%, W 8%) | 4.0 |
| Isoelastic (Fe 55.5%, Ni 36% Cr 8%, Mn 0.5%) | 3.6 |
| Constantan/Advance/Copel (Ni 45%, Cu 55%) | 2.1 |
| Nichrome V (Ni 80%, Cr 20%) | 2.1 |
| Karma (Ni 74%, Cr 20%, Al 3%, Fe 3%) | 2.0 |
| Armour D (Fe 70%, Cr 20%, Al 10%) | 2.0 |
| Monel (Ni 67%, Cu 33%) | 1.9 |
| Manganin (Cu 84%, Mn 12%, Ni 4%) | 0.47 |
| Nickel (Ni 100%) | −12.1 |

When a load is applied to the surface of the strain gage, there is a resulting change in surface length. This change in length is measured through the resulting change in electrical resistance of the foil wire, which varies linearly with strain. Strain sensitivity, commonly known as gage factor (GF), is an experimentally determined dimensionless number for each strain transducer type according to the following equation:

$$GF = \frac{\frac{\Delta R}{R}}{\varepsilon}$$

In the equation above, R represents the initial resistance of the sensing element, ΔR represents the change in resistance of the sensing element, and E represents the measured strain value. This gage factor corresponds to the linear relationship between strain and resistance, and it is used to convert the measured resistance change into units of strain. Major manufacturers of metallic foil strain gages include but are not limited to OMEGA Engineering Inc., Vishay Precision Group, Inc., HBM Test and Measurement, and Kyowa Electronic Instruments. Metallic foil strain gages have the ability to measure both static strain and dynamic strain depending on the signal conditioning and measurement system being used.

Figure 3A:
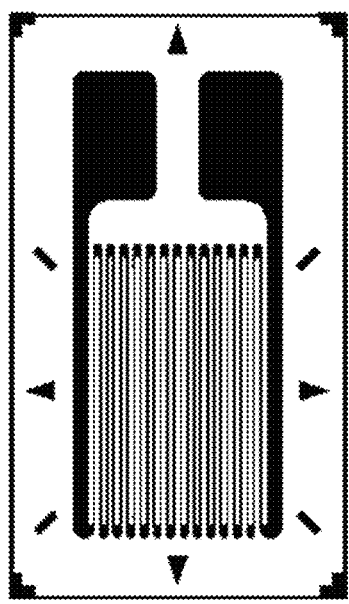
FIG. 3A shows a uniaxial strain gage.
Figure 3D:
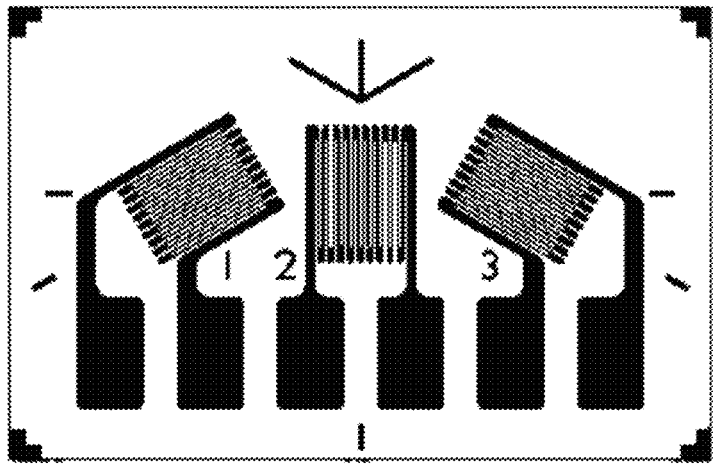
FIG. 3D shows a delta rosette strain gage.
Figure 3B:
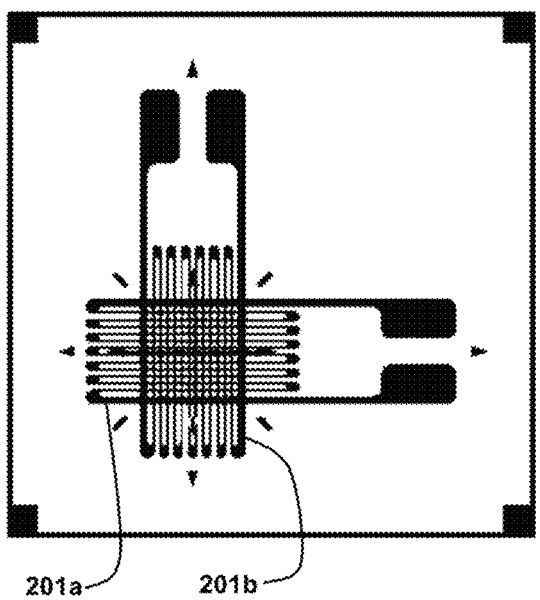
FIG. 3B shows a 90-degree biaxial tee rosette strain gage.
Figure 3C:
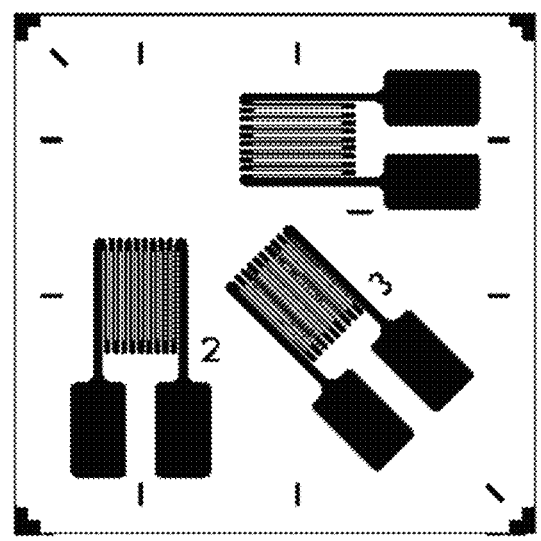
FIG. 3C shows a rectangular rosette strain gage.

Numerous different configurations of metallic foil strain gages exist that can be utilized in embodiments of the present invention. Referring to FIG. 3A a uniaxial strain gage is comprised of a single foil grid that measures strain in one principal direction. Referring to FIG. 3B a 90-degree biaxial tee rosette strain gage is comprised of two separate foil grids, a first foil grid shown at 201a and a second foil grid shown at 201b. The two foil grids 201a and 201b are oriented 90 degrees apart from each other in a 90-degree biaxial tee rosette strain gage. The two strain gauge types shown in FIG. 3A and FIG. 3B are only used when the principal strain directions are known in advance. Using biaxial metallic foil strain gages, such as the one shown in FIG. 3B, one sensing grid will be oriented 90 degrees from the principal measurement direction in a non-stressed axis. This second strain grid is used as a second leg of a half-bridge Wheatstone bridge circuit in order to apply temperature compensation to the measurement. When the temperature of the strain gage changes the resistance of the gage is effected due to differences in thermal growth between the gage and the measured surface. By using biaxial strain gage rosettes, the change in temperature affects both strain gages equally. Because the changes in resistance are identical, the ratio of their resistance does not change and the voltage output of the Wheatstone bridge does not change due to temperature fluctuations. FIG. 3C shows a rectangular rosette strain gage. A rectangular rosette strain gage configuration consists of three different foil grids spaced 45 degrees apart. FIG. 3D shows a delta rosette strain gage. A delta rosette strain gage configuration consists of three different foil grids spaced 60 degrees apart. The advantage of rectangular rosette and delta rosette strain gage configurations is that the principal strain direction can be derived directly from the strain measurements.

Piezoelectric strain sensors are another transducer technology that can be used to measure dynamic strain for the purposes of fluid film bearing monitoring and failure detection. Piezoelectric strain sensors utilize a thin piezoelectric film that is bonded to the strained surface much in the same way as metallic foil strain gages. Quartz crystal is typically used as the piezoelectric element for the sensors. The crystal has a piezoelectric effect that produces a voltage proportional to compressive or tensile mechanical strain observed. Piezoelectric strain sensors are able to achieve higher sensitivity values than metallic-foil strain sensors, which make them ideal for accurate dynamic strain measurements. A common sensitivity found in piezoelectric strain gages is 50 mV/με, with a measurement range of ±100 με. Due to the high stiffness and low mass of piezoelectric strain sensors, these sensors achieve a very high resonant frequency that allows a measurement frequency range of 0.5 Hz to 100 kHz.

Figure 4:
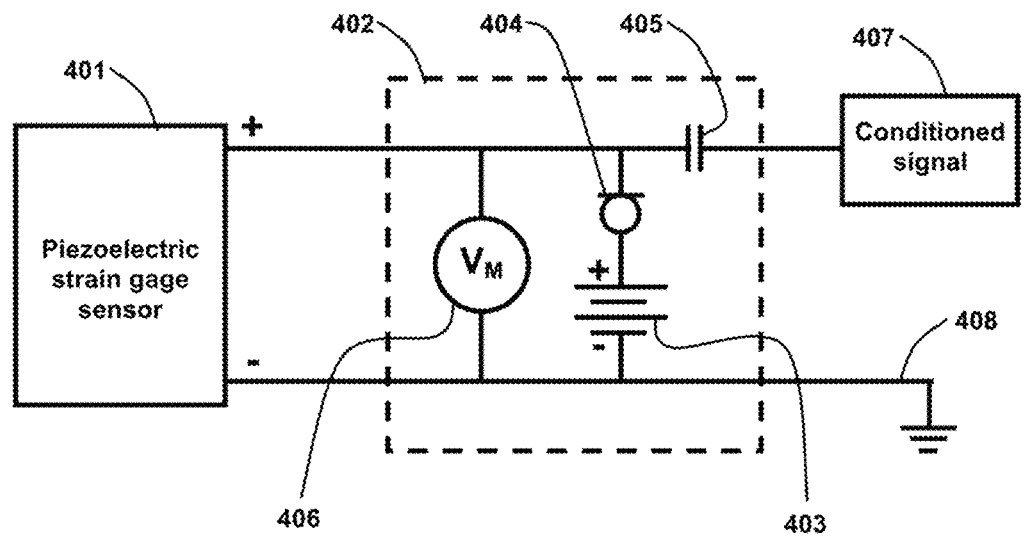
FIG. 4 shows a schematic of a signal conditioning system.

FIG. 4 shows a typical signal conditioning system schematic. This particular circuit is for a PCB Piezotronics, piezoelectric strain gage model 740B02 and is a typical example of the industry standard IEPE (Integrated Electronic Piezoelectric) signal conditioning that is also used for many industrial accelerometers. Referring to FIG. 4, a piezoelectric sensor is shown at 401. The typical piezoelectric sensor 401 comprises a piezoelectric crystal, a resistor and an amplifier. The + and − outputs of the piezoelectric sensor are connected to the signal conditioner, shown at 402. The signal conditioner 402 typically comprises a constant voltage source 403, a constant current diode 404, and an inline coupling capacitor 405 in the configuration shown in FIG. 4. Excitation power can be 18-30 volts with 2-20 mA of constant current. The signal conditioner 402 can further comprise a voltmeter, shown at 406. The resulting conditioned signal 407 can then be fed into the rest of the circuit either as a single input or as a two-wire input including the ground connection 408.

Piezoresistive strain sensors are another transducer technology that can be used to measure dynamic strain for the purposes of fluid film bearing monitoring. Piezoresistive strain sensors utilize a crystalline structure that changes electrical resistance under applied strain. In a piezoresistive strain sensor, strain produces changes in interatomic spacing, which affect the electrical band gaps and therefore allows electrons to be raised into the conduction band, resulting in a change of the electrical resistivity of the material. Within a certain range of strain, this relationship is linear. Piezoresistive strain sensors differ from metallic foil strain gages, which predominantly see a change in resistance due to changes in cross sectional area of the foil grid from applied strain. Piezoresistive strain sensors typically utilize a semiconductor in which resistance is largely controlled by the piezoresistive effect. The most common semiconductors utilized are germanium and silicon. Germanium has a gage factor of up to 500 depending on crystalline structure and temperature, which is three times higher than silicon. The useable frequency range for piezoresistive strain sensors is similar to that of piezoelectric strain sensors, and depends largely on the natural frequency of the piezoresistive material. Since piezoresistive strain sensors directly measure resistance, the same signal processing circuit used with metallic foil strain gages, consisting of a Wheatstone bridge, can be used to amplify and measure small changes in the resistance sensed by the piezoresistive strain sensor.

Further referring to FIG. 2A and FIG. 2B, the system and method shown operate on the principle that the strain gauge or gages will measure a deflection (or deflections) in the babbitt material, or another part of the bearing housing, caused by the force of the fluid wedge. Typical strain gauge measurement systems output an overall voltage that is converted into strain and then stress. This stress value is all that is typically desired for most common industry applications. The strain data can also be dynamically sampled to facilitate processing of the data at a higher level. Deflections of the strain gages can be proportional to the pressure of the wedge. Dynamic sampling of the strains can be used to correlate the dynamic behavior of the pressure wedge and oil distribution. The location and number of strain gauges can be optimized based on the configuration and application for the fluid film bearing. To monitor the condition of the pressure wedge, strain gauges can be oriented radially around the bearing housing 102 or babbitt 202 with a principal measurement direction that goes through the geometric center of the bearing bore. Minimally two strain gages spaced radially 90 degrees apart are required, however numerous strain gages can be used to span the entire 360-degree circumference of the bearing. This strain gage orientation allows for indirect estimation of radial forces applied from the shaft through the fluid wedge to the babbitt, or other part of the bearing housing. The strain gages can be directly bonded to the outer exposed surface of the babbitt, or other part of the bearing housing, with a thin layer of epoxy resin or cast directly into the babbitt material, or the material used for another part of the bearing housing.

Figure 5:
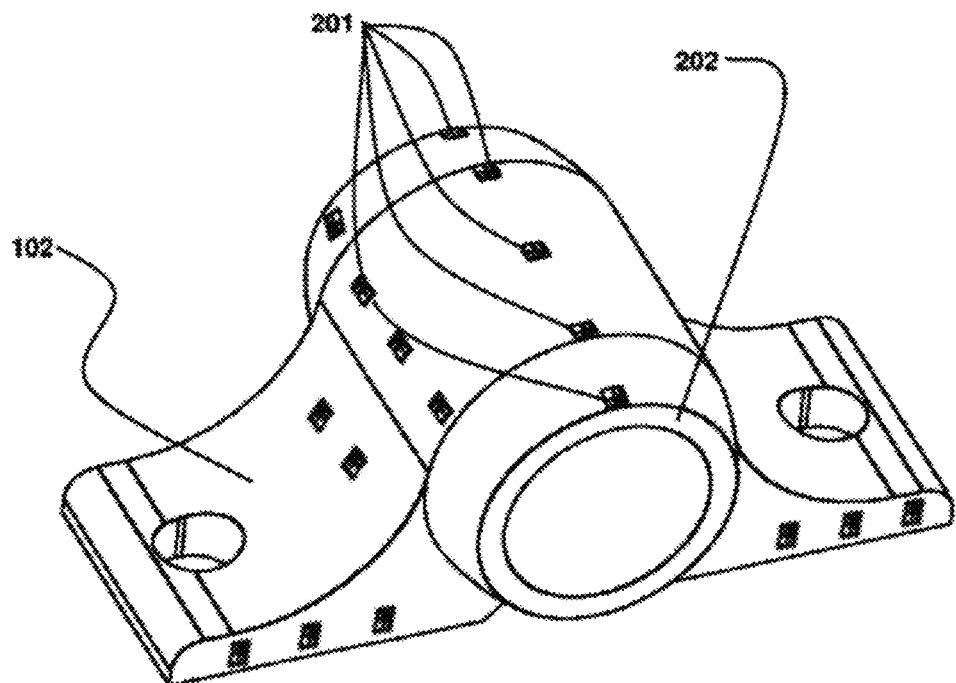
FIG. 5 shows the placement of strain gages in the mounting block for a rotating shaft.

FIG. 5 illustrates that strain gages (shown at 201) can also be distributed axially in the babbitt material 202, or some other part of the bearing housing 102 of a fluid film bearing. One benefit of axial placement of strain gages is that the axial distribution and uniformity of the oil pressure (or other fluid) can be measured. Referring in detail to FIG. 5, the strain gages 202 are oriented in such a way as to measure either axial strain (parallel to the shaft and bearing bore centerline), or strain tangential to the bearing bore centerline. A similar strain gage configuration can consist of strain gages 201 distributed axially directly beneath the babbitt 202, but with one measurement direction in the vertical direction and the other still oriented tangential. This configuration allows vertical strain to be measured at several different points axially along the length of the bearing. Large amplitudes of strain on one end of the bearing with corresponding low amplitudes on the opposite end are an indication of a vertical offset misalignment. These configurations can comprise strain gages 201 adhered directly to the surface of the bearing housing, embedded into the babbitt 202, mounted in narrow slots milled into the surface of the bearing housing 102, or mounted in some other part of the bearing housing 102. Referring to FIG. 2A, FIG. 2B, and FIG. 5, the strain gage or gages can be attached via adhesion, welding, or casting them into place, or any other technique capable of being understood by anyone skilled in the art.

FIG. 5 also illustrates that strain gages 201 can be placed in other locations on the bearing housing 102. Gages 201 will measure the strain at any location applied and are not confined in operation to the babbitt 202.

Figure 6:
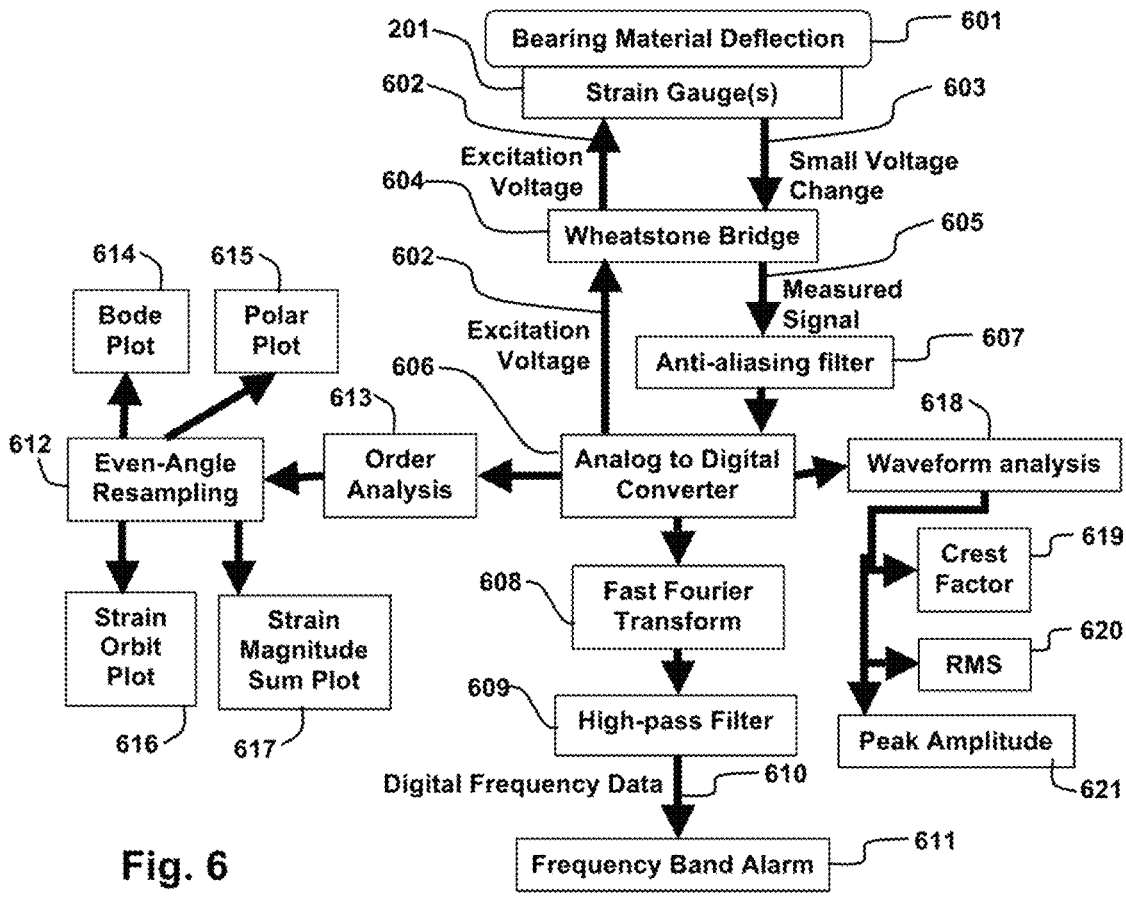
FIG. 6 shows a block diagram of one embodiment of a strain measurement based system and method for failure detection of a rotating machine.

FIG. 6 shows a block diagram of a system that converts bearing material deflection 601, as measured by one or more strain gages, into signals and graphs that can be analyzed to determine the health of a fluid film bearing. Referring to FIG. 6, the strain gauge (or gages) 201 is attached to some part of the bearing material, using a method that has been described previously in this disclosure. The strain gage (or gages) is responsive to bearing material deflection 601. The strain gage 201 (or gages) receives an excitation voltage, shown at 602, of 2.5 v, 5 v, or 10 v (constant voltage) and produces a small voltage change, shown at 603, that corresponds linearly to the measured bearing material deflection 601 per unit length (i.e. strain). Exact excitation voltage can vary depending on the type of strain gage used, but practically has been limited to 0.1 mV to 24 V. The excitation voltage 602 and small voltage change 603 are connected to a Wheatstone bridge circuit 604, shown in detail in FIG. 7, to generate a measured signal, shown at 605.

Figure 7:
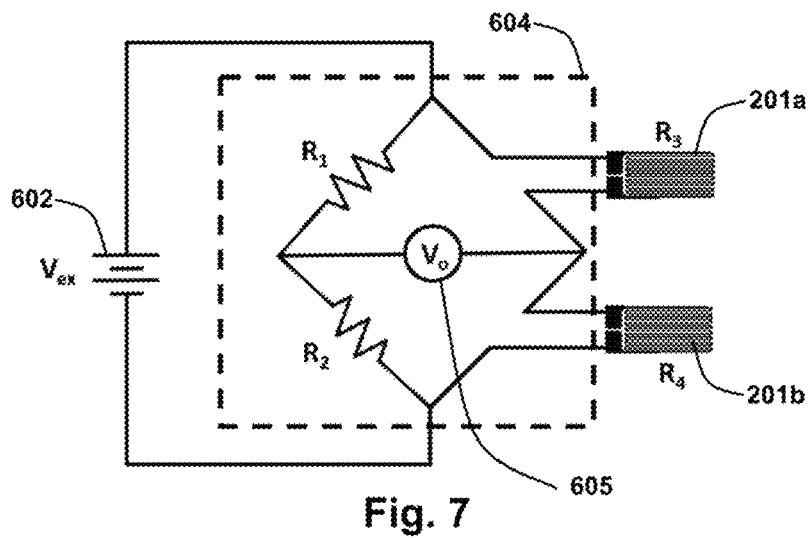
FIG. 7 shows a Wheatstone bridge circuit.

Further referring to FIG. 7, typical values for resistors $R_1$ and $R_2$ are 100 kΩ. This represents the half-bridge circuit configuration that is used with biaxial strain gages to apply thermal compensation to the measurement. A first foil grid 201a in the bridge is oriented in the principal strain direction, and the second foil grid 201b (often called a dummy leg) is oriented in an unstrained direction. The specifics of this strain measurement configuration can more clearly be understood by looking at FIG. 3B, which also shows the two foil grids of a biaxial strain gage at 201a and 201b. Any change in resistance due to thermal effects is identical for each foil grid, 201a or 201b, of the biaxial strain gage. The ratio between resistances therefore does not change due to thermal effects, and the output voltage 605 to the analog to digital converter remains unaffected by temperature fluctuations.

Further referring to FIG. 6, the measured signal 605 from the Wheatstone bridge 604 is then processed by an analog to digital converter 606. The analog to digital converter 606 can be of any type capable of being understood by anyone skilled in the art. The analog to digital converter 606 can output 2-32 bits, or higher, of digital amplitude resolution. The analog to digital converter 606 can be of a type and configuration that samples any and/or all frequencies, with a desired range being at least 0.1 Hz. Common analog to digital converters can sample up to 100 kHz. A minimum of 2 bits of resolution is needed, but the maximum number of bits can be any value. Prior to being processed by the analog to digital converter 606, the measured signal 605 can be processed in analog form by an anti-aliasing analog low pass filter 607. The anti-aliasing filter 607 can have a cutoff frequency equal to a maximum of 50% of the sampling rate. The anti-aliasing filter 607 is applied to the analog signal before any data has been converted to digital data. The anti-aliasing filter 607 ensures that no erroneous frequencies are present in the sampled data. After the data has been digitized, a Fourier transform or Fast Fourier Transform (FFT) can be applied to the signal as shown at 608, to convert the signal from the time domain to the frequency domain. A high pass filter 609 with a cutoff frequency ranging from 0.1 Hz to 10 Hz should also be applied to the signal. The high pass filter operation 609 can be performed before or after the FFT 608, via either software or hardware filtering. The high pass filter 609 can also be applied to the analog signal before it is digitized in the analog to digital converter 606. The digital frequency data 610 can be presented spectrally, illustrating the frequency response. A frequency band alarm 601 (or alarms) can be applied to the digital frequency data 610. The digital frequency data 610 can be measured and trends of the overall amplitude of each frequency component can be studied. Strain data can be resampled with shaft angular displacement to convert it to an even-angle signal, a step shown at 612. This means each resampled data point is offset from the previous sample by an even-angle, not even time. Order analysis can be performed by narrowband filtering certain orders of running speed, and noting amplitude and phase of the sinusoidal signal, a step shown at 613. This data can be used in Bode plots 614 and polar plots 615 for fault diagnostics. Strain data from one sensor can be plotted against the data from strain sensors at other locations to create plots that are similar to X-Y plots 616 normally created with proximity probes. X-Y plots 616 can show the AC (alternating current) component of the signals from 2 or more strain gauges against each other to idealize total directional bearing strain. The DC (direct current) component of the strain signal can be plotted in a manner similar to a shaft centerline plot for proximity probes. These two plots are novel techniques for gaining insight into the dynamics within fluid film bearings. Strain magnitude sum plots 617 can also be created. The digital output from the analog to digital converter can also be used for various kinds of waveform analysis 618, such as analyzing the crest factor 619, RMS (root mean squared) values 620, and peak amplitudes 621.

Figure 8A:
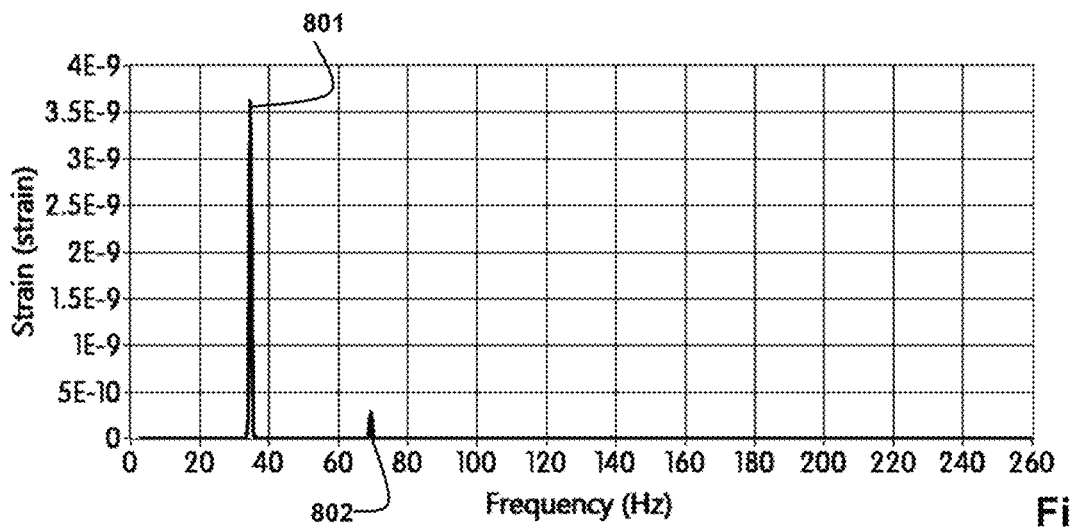
FIG. 8A shows the output signal in the frequency domain of a radial strain gage for a fluid film bearing that is in good condition.

FIG. 8A shows one output from the system described in FIG. 6 and FIG. 7, for a fluid film bearing that is operating normally. In this case, the time varying measured signal from the Wheatstone bridge has been digitized and then converted into the frequency domain using a fast Fourier transform and plotted to show amplitude as a function of frequency to produce digital frequency data (610 in FIG. 6). The plot of digital frequency data shows a large peak at about 34 Hertz (Hz) at 801 and a smaller peak at 2× this frequency (about 68 Hz) at 802, with no other significant oscillations in strain in the bearing. The 34 Hz peak 801 represents the rotational rate of the shaft in the fluid film bearing.

Figure 8B:
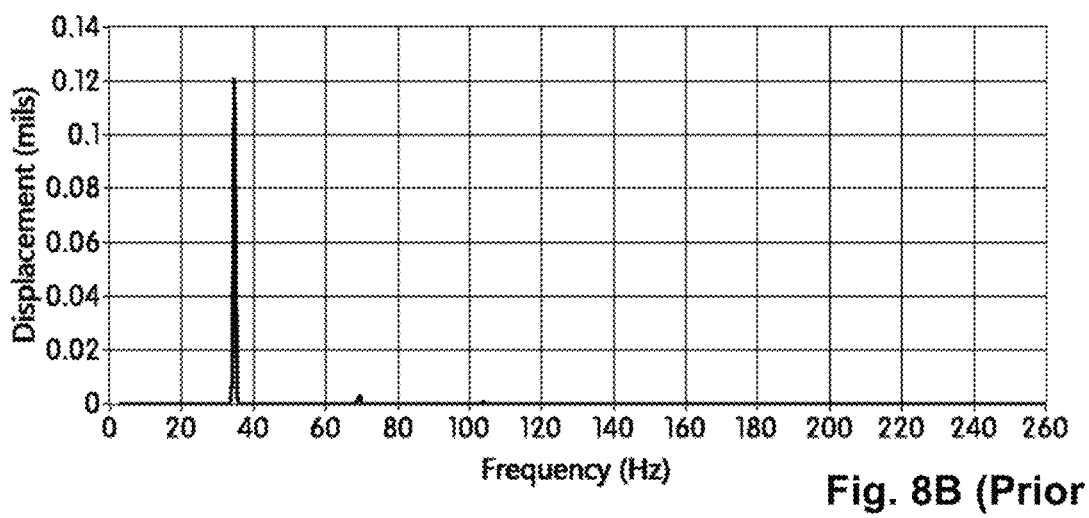
FIG. 8B shows the output signal in the frequency domain of a prior art proximity probe for a fluid film bearing that is in good condition.

FIG. 8B shows a similar output in the frequency domain for the same fluid film bearing as the bearing whose data was shown in FIG. 8A. The difference is that the signal to generate plot for FIG. 8B came from a proximity probe and the signal to generate the plot for FIG. 8A came from a strain gage. It is known in the prior art to use proximity probes for measuring the health of a fluid film bearing. It is much simpler and less expensive to use a strain gage than to use a proximity probe. Instrumenting a bearing with strain gages does not require machining threaded holes into the bearing housing as is required with proximity probes. A comparison of FIG. 8A and FIG. 8B shows that strain gages, can provide data that correlates highly with the data that comes from a proximity probe for a fluid film bearing that is operating normally.

Figure 8C:
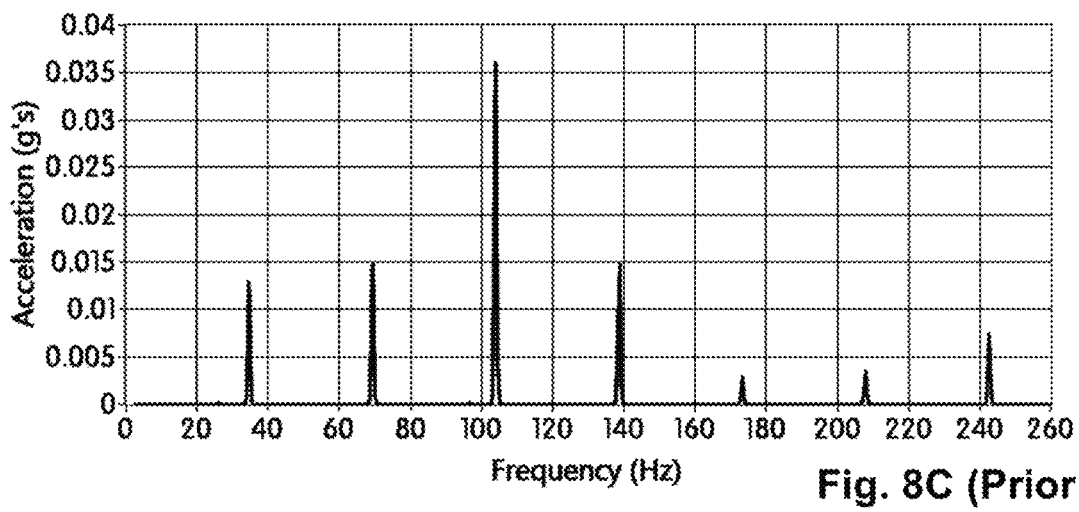
FIG. 8C shows the output signal in the frequency domain of a prior art accelerometer for a fluid film bearing that is in good condition.

FIG. 8C shows a similar output in the frequency domain for the same bearing as the bearing whose data was shown in FIG. 8A. The difference is that the signal to generate plot for FIG. 8C came from an accelerometer and the signal to generate the plot for FIG. 8A came from a strain gage. It is known in the prior art to use accelerometers for measuring the health of a fluid film bearing. However, accelerometers produce a signal that has much more high frequency noise in it. This high frequency noise coming from a healthy fluid film bearing can be difficult to distinguish from high-frequency data that shows that a fluid film bearing is failing.

Figure 9A:
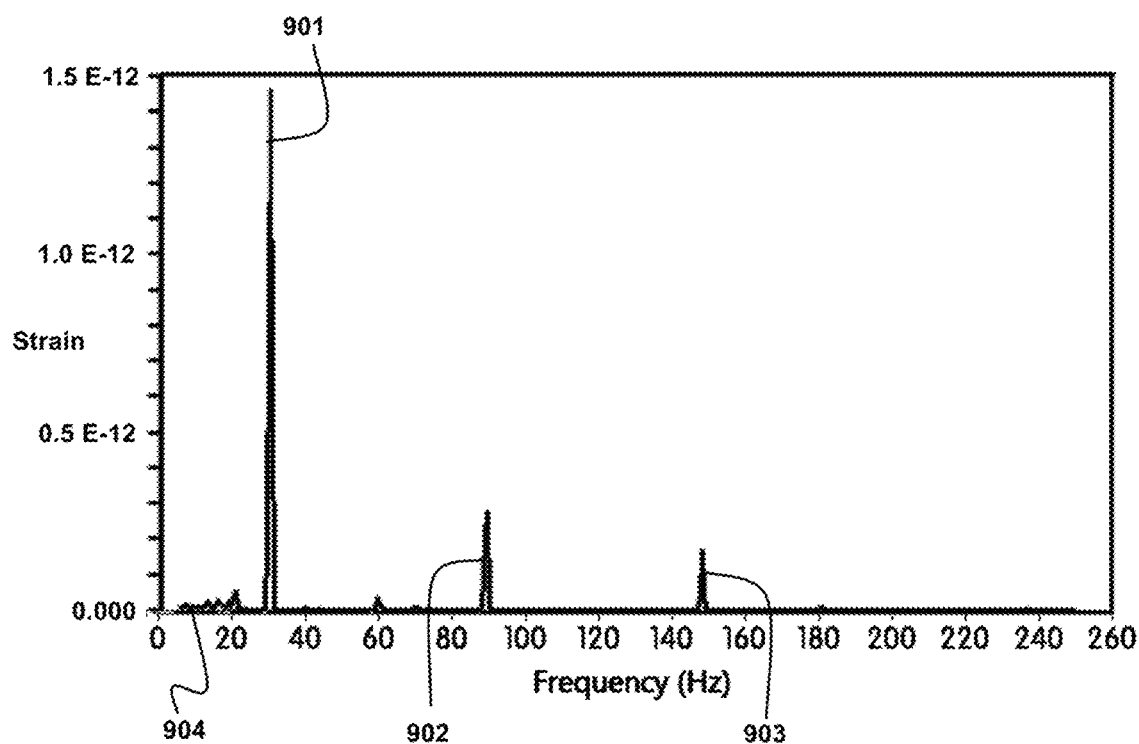
FIG. 9A shows the output signal in the frequency domain of a radial strain gage for a fluid film bearing that is unstable.

FIG. 9A shows one output from the system described in FIG. 6 and FIG. 7, for a fluid film bearing that is unstable and has therefore failed. When comparing the output shown in FIG. 9A with the output shown in FIG. 8A, one can see that FIG. 9A shows additional peaks at frequencies not found in FIG. 8A. In this case, these additional peaks occur at frequencies of approximately 88 Hz, shown at 902, and 148 Hz, shown at 903. The peaks at 88 Hz 902 and 148 Hz 903 are not harmonics of the main 30 Hz frequency, shown at 901, in this plot and are not harmonics of each other. The main 30 Hz frequency 901 represents the rotational speed of the shaft. Notice that there are also low frequency strains in the range of 20 Hz and below, shown at 904. These low frequency strains 904 indicate failure and this particular failure mode is known as whirling.

Figure 9B:
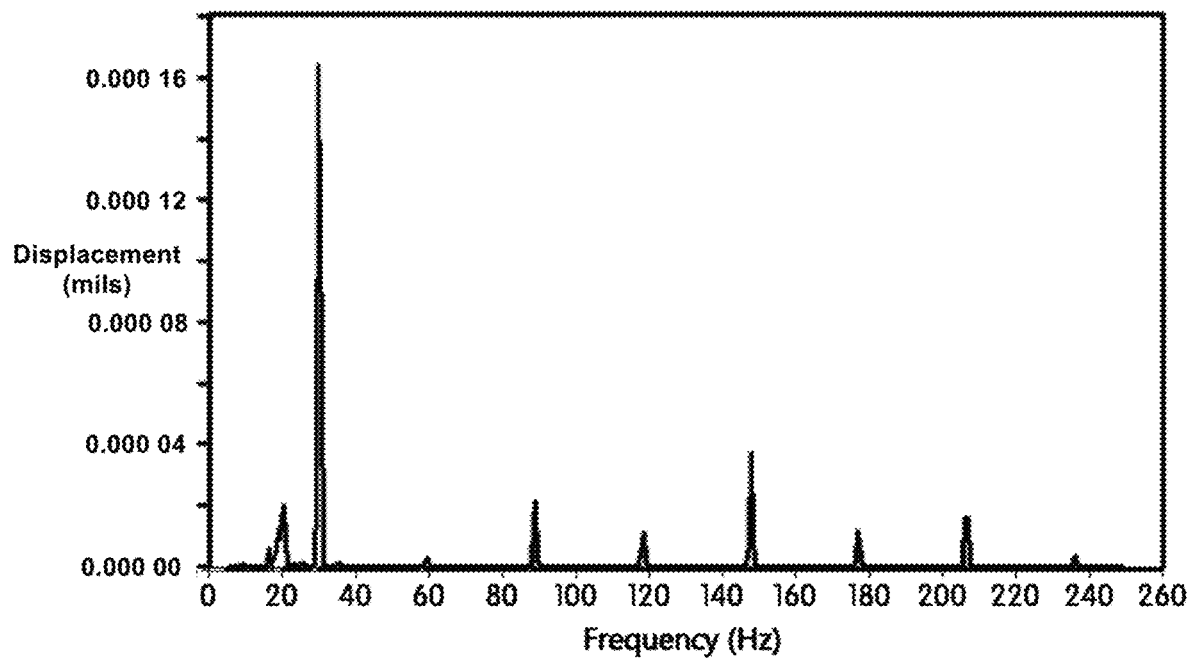
FIG. 9B shows the output signal in the frequency domain of a prior art proximity probe for a fluid film bearing that is unstable.

FIG. 9B shows a similar output in the frequency domain for the same fluid film bearing as the bearing whose data was shown in FIG. 9A. The difference is that the signal to generate plot for FIG. 9B came from a proximity probe and the signal to generate the plot for FIG. 9A came from a strain gage. A comparison of FIG. 9A and FIG. 9B shows that strain gages can provide data that correlates highly with the data that comes from a proximity probe for an unstable fluid film bearing. Both plots show the additional non-harmonic high frequency signals as well as the low frequency whirling.

Figure 10A:
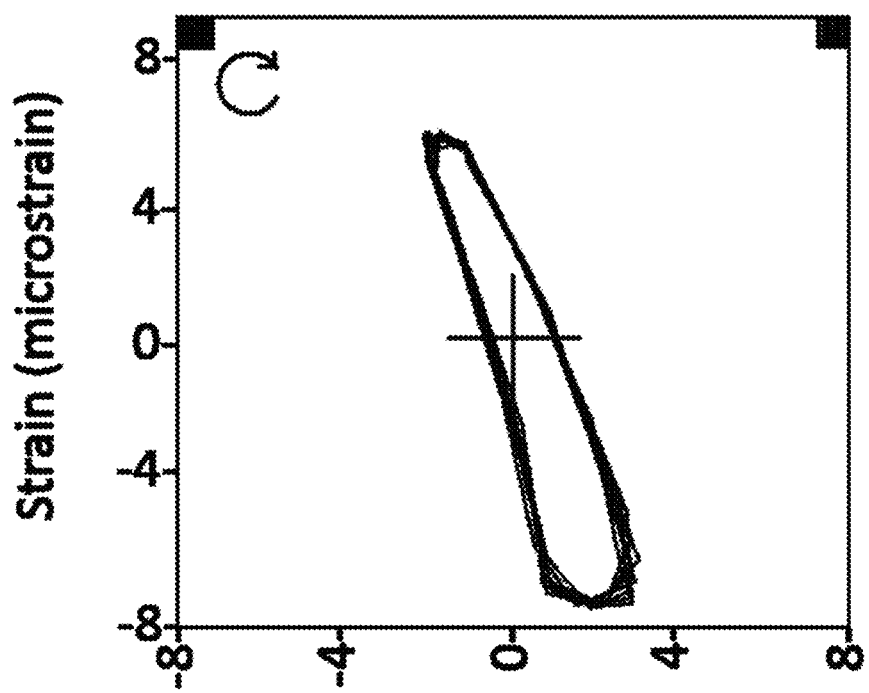
FIG. 10A shows the x-y strain gage output signal for 3 rotations of a system that uses a pair of radially oriented strain gages spaced 90 degrees apart in a babbitt of a bearing housing.
Figure 10B:
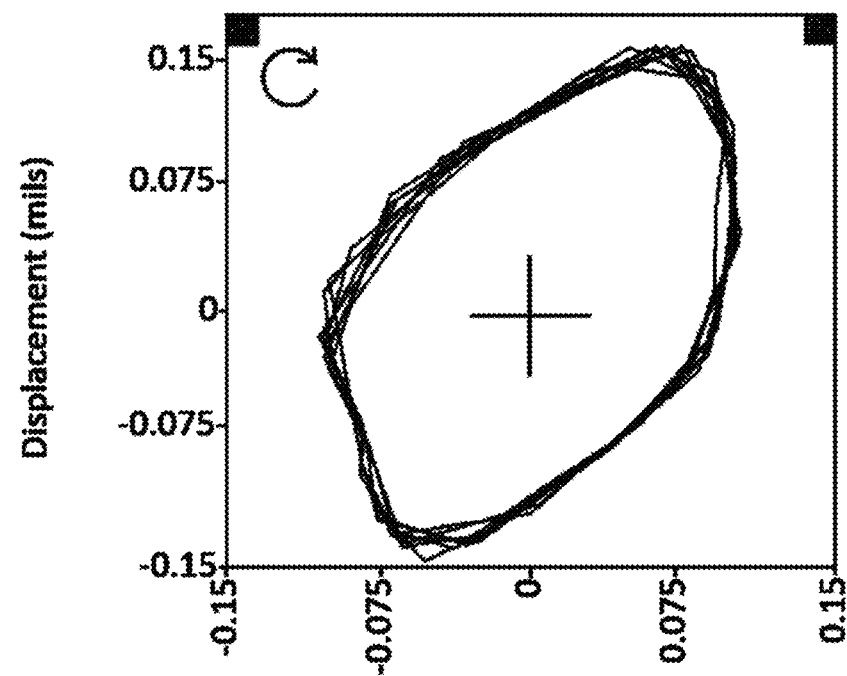
FIG. 10B shows the x-y displacement output signal for 3 rotations of a prior art system that uses a pair of radially oriented proximity probes spaced 90 degrees apart.
Figure 10C:
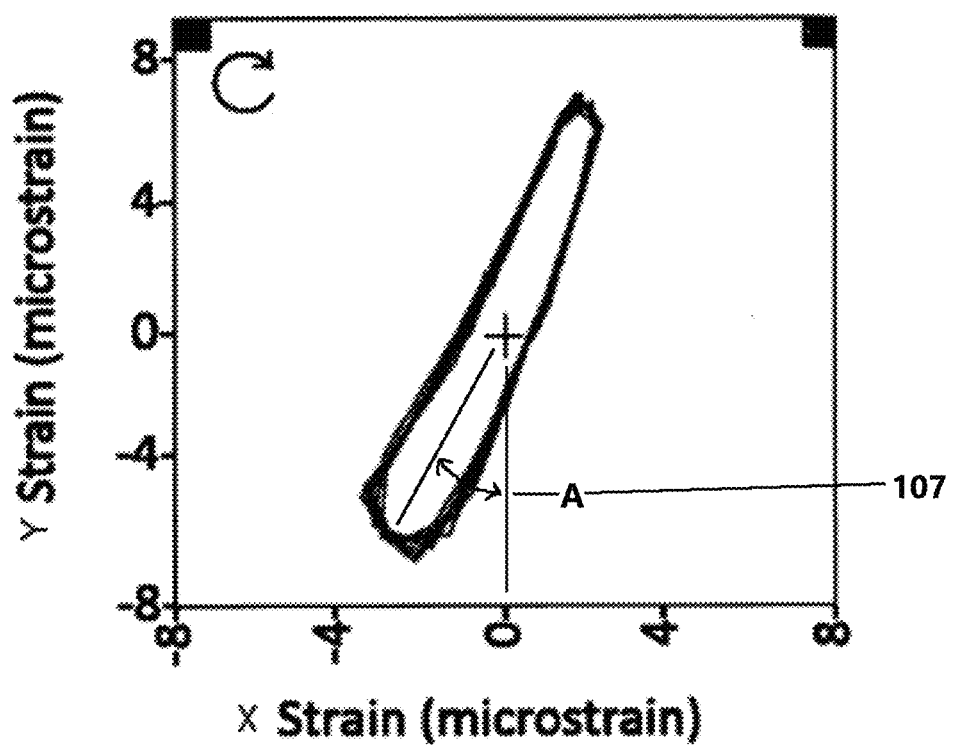
FIG. 10C shows the perpendicular strain gage output signal for multiple rotations of the shaft in FIG. 1 that illustrates the direction of the oil wedge in FIG. 1.

FIG. 10A shows a plot of the strain measured by two strain gages that are 90 degrees apart for three rotations of a shaft as plotted on an X-Y graph. FIG. 10B shows an X-Y plot (also known as an orbit plot) of the displacement measured by two proximity probes (prior art) that are 90 degrees apart for the same shaft that was used to generate the data for FIG. 10A. Again, these plots show a high degree of correlation between the data obtained using strain gages and that using proximity probes.

FIG. 10C shows a plot of the strain measured by two strain gages 201 as arranged in FIG. 1 for three rotations of a shaft as plotted on an X-Y graph. Comparison between FIG. 10C and FIG. 1 shows a high degree of correlation between the location of the point of highest pressure 106 in the bearing 100 and the angular directionality 107 of the plot. The phase angle of maximum strain amplitude 107 in FIG. 10C is equivalent to the angle 107 at which the oil wedge has formed in the fluid film bearing 100. In FIG. 1, the fluid pressure profile 105 shows the highest pressure 106 to be located here. Since the compressed oil acts as a stiff medium, maximum strain is experienced in this direction.

Figure 11A:
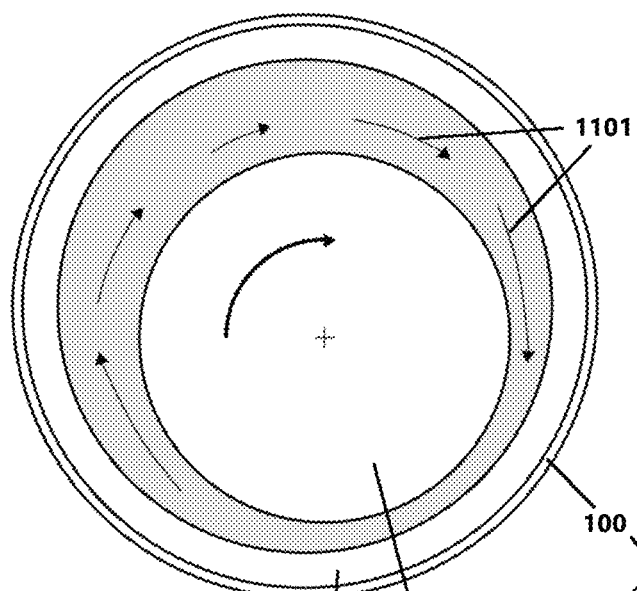
FIG. 11A shows oil whirl in a system using a fluid film bearing.

FIG. 11A shows the natural flow of fluid in a fluid film bearing 100. Average velocity of the fluid between the shaft 101 and babbitt 202 is generally 0.4-0.5 times the shaft running speed. If a high-pressure region 103 fails to form as the shaft rotates, the fluid may begin to move around the shaft at this speed. This phenomenon is called 'whirl' or 'oil whirl' and will create a vibration spectrum like that depicted in FIG. 12C. More specifically, FIG. 12C shows a strain root-mean-squared versus frequency spectrum caused by whirl in a fluid film bearing 100. The numbers above each peak indicate the multiple of running speed (1×) the peak represents. These multiples are referred to as 'orders' of running speed. In whirl, the fluid in the bearing 100 will move around the shaft 101 at around 0.4-0.5 times the running speed. This motion puts strain on the babbitt at this frequency, and a peak is seen at this frequency in the spectrum. The spectrum of whirl is unique because it shows a peak below running speed within the 0.4-0.5 range and this peak would indicate a whirl even with other content present in the spectrum.

Figure 11B:
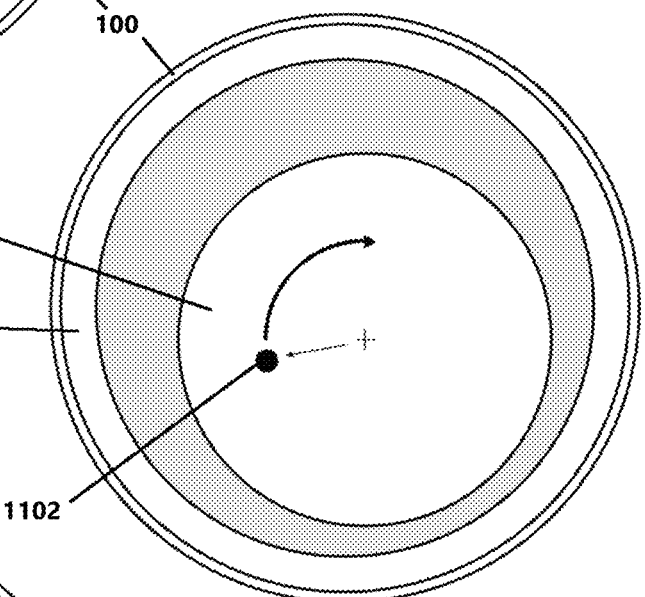
FIG. 11B shows unbalance in a system using a fluid film bearing.

FIG. 11B shows a heavy spot present on the shaft 101 which creates a rotating, radial force at the running frequency. This condition is called 'unbalance' and will create a vibration spectrum similar to that shown in FIG. 12D. More specifically, FIG. 12D shows a strain root-meansquared versus frequency spectrum caused by unbalance. The numbers above each peak indicate the multiple of running speed (1×) the peak represents. In unbalance, the off-centered weight of the shaft 101 creates a force radially which creates strain in the babbitt 202 at the same frequency as running speed. The 2× peak is shown here to illustrate the larger amplitude of 1× compared to any other frequencies in the spectrum. The spectrum for unbalance condition is visually similar to spectra for an eccentric stator, soft foot, and some kinds of misalignment or bent shafts. Each of these malfunctions will cause high vibrations at running speed. To determine the exact issue, phase analysis will be performed in response to a spectrum with dominant and high running speed amplitude.

Figure 11C:
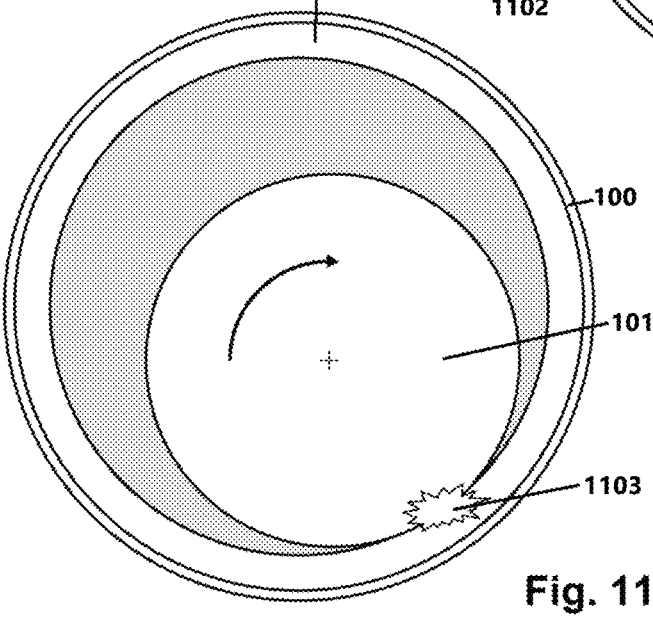
FIG. 11C shows an impact or rub of a rotating shaft when the fluid film in a bearing fails to support the rotating shaft.

FIG. 11C shows impacting or a rub condition, wherein the shaft 101 contacts the bearing 102 during operation. This can also be referred to as a collision of a rotating shaft on a babbitt. If the contacting is periodic it is called 'impacting' and will excite many harmonics of running frequency as depicted in FIG. 12B. If the contact happens randomly, it is called a 'rub' and will instead create a noisy spectrum. More specifically, FIG. 12B shows a strain root-mean-squared versus frequency spectrum caused by impacting. The numbers above each peak indicate the multiple of running speed (1×) the peak represents. When impacts appear in a strain time waveform, they appear as spikes rather than sinusoidal waveforms. When a Fourier transformation 608 is taken from a signal that isn't sinusoidal, the result is many harmonics (or integer multiples) of that frequency appearing in the spectrum. This spectrum is unique to all malfunctions with non-sinusoidal signatures, impacting being the most common. Impacts in any part of the machine will result in many harmonics of the impact rate appearing in the spectrum. Common impacting malfunctions include but are not limited to structural looseness, improper clearance or tolerance of machine components or actual impacting between the machine and another body.

Figure 12A:
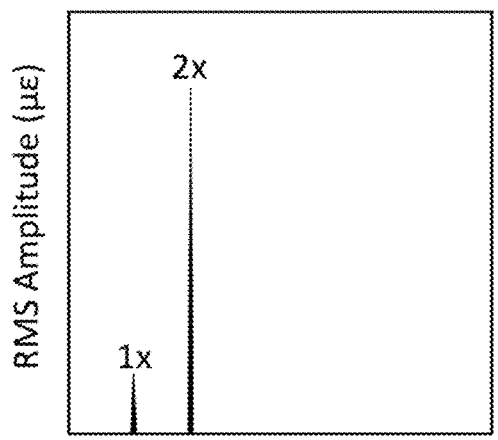
FIG. 12A shows an amplitude versus frequency spectrum plot of strain caused by a misaligned fluid film bearing.
Figure 12B:
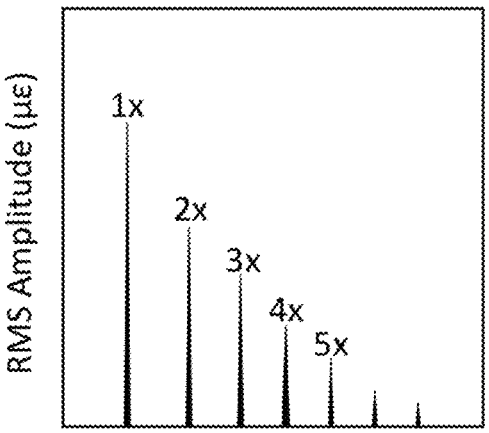
FIG. 12B shows an amplitude versus frequency spectrum plot of strain caused by a fluid film bearing having impacts of the type shown in FIG. 11C.
Figure 12C:
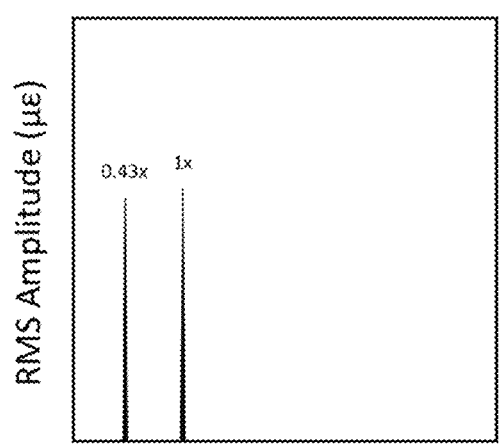
FIG. 12C shows an amplitude versus frequency spectrum plot of the strain caused by a fluid film bearing experiencing whirl of the type that was illustrated in FIG. 11A.
Figure 12D:
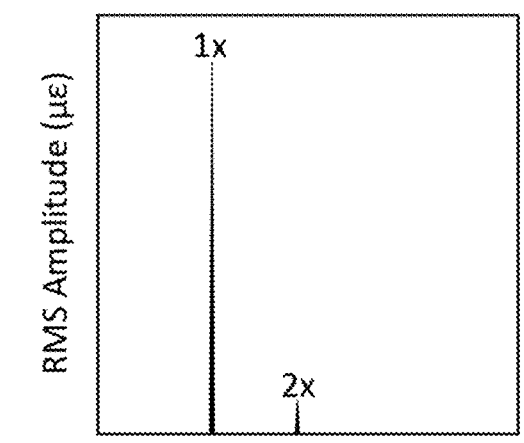
FIG. 12D shows an amplitude versus frequency spectrum plot of strain for a rotating machine experiencing an unbalance or resonance.

FIG. 12A shows a strain root-mean-squared versus frequency spectrum caused by shaft misalignment. The numbers above each peak indicate the multiple of running speed (1×) the peak represents. In shaft misalignment, a coupling attempts to bend two normally straight shafts to accommodate the plane of misalignment. This plane of misalignment is fixed and the misaligned shafts rotate though this plane. This causes the shafts 101 to push and pull their supporting bearings twice in one cycle of rotation. This motion creates high strain amplitudes at twice the rate of running speed, creating such a spectrum.

Figure 12E:
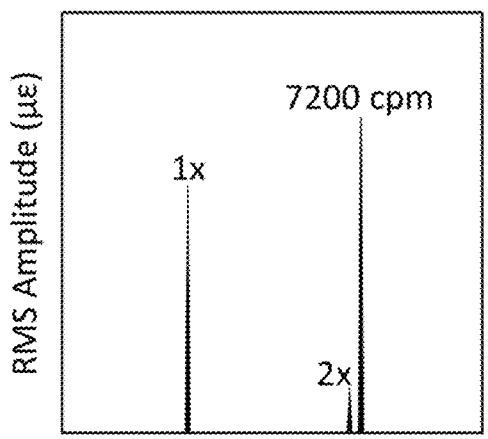
FIG. 12E shows an amplitude versus frequency spectrum plot of strain for a machine experiencing a motor stator fault.

FIG. 12E shows a strain root-mean-squared versus frequency spectrum caused by a motor stator fault. The numbers above each peak indicate the multiple of running speed (1×) the peak represents while 7200 represents a peak at 7200 cpm. 7200 is significant as it is the frequency at which torque is applied to a shaft 101 in an AC motor. Vibration and strain at 7200 cpm is normally present in low amplitudes, but relatively large amplitudes as depicted in FIG. 12E indicate a malfunction or defect within the AC motor, resulting in problems with the application of the torque to the shaft 101. When problems occur in torque application at 7200 cpm (cycles per minute, which is 2×60 Hz), this peak will appear prominent in the spectrum. This spectrum is unique to electromagnetic malfunctions because double AC line frequency is exactly 7200 cpm when the supplied power is at 60 Hz.

FIGS. 13A, 13B, 13C and 13D show branches of a process flowchart used to diagnose machine faults from spectral data and additional analysis common to machine monitoring. Diamond shapes represent spectral signatures, which may be present from an FFT 608 spectrum and the presence or absence of these signatures can isolate their cause. Strain spectrums can be used in conjunction with such a process to determine machine faults and guide maintenance.

Further referring to FIG. 13A, the process of spectrum-based diagnosis begins at the starting marker 1301. The first action in spectral analysis is gathering the machine's history 1302, which may include past failures, rate of failure, recent maintenance or other happenings, which may affect performance. Next, machine details 1303 such as shaft running speed, power source, electrical frequency, gear ratios, bearing types, structural support, etc. must be gathered to aid diagnosis. At this point, spectral data are collected from the machine.

Proper procedure in collection of spectral data from machinery involves multiple spectra with different parameters to best represent certain kinds of energy in the measured system. All digital spectra have a resolution parameter, which determines the smallest difference in frequency it can represent. A spectrum with 60 cpm resolution will combine amplitudes of frequencies within the same 60 cpm region (or 'bin') as one single peak. This phenomenon is used to detect distinct kinds of energy in a system by taking spectrums with both high and low resolution. High-resolution spectra will show more accurate amplitudes and resolve active frequencies, which are very close, as in beating 1304. Rather than occurring at a specific frequency, random energy occurs at wide ranges of frequencies and rarely the same frequency often enough to appear in a high-resolution spectrum. Low-resolution spectra will sweep wide ranges of frequencies together and combine their energy, which can highlight random energy in a system. Using both kinds of spectral resolution, analysts can detect malfunction from both closely resolved periodic signals and random energy in a machine.

Beating 1304 is caused by the interaction between two machines nearby each other, which operate at nearly the same speed. This results in the machines slowly moving in-and-out of phase with each other's vibration and creating strong, pulsing vibration all around them. Beating can be seen in a high-resolution spectrum if the resolution is less than the difference between each machine's running speeds. It can be reduced or eliminated by isolating the machine from the other vibration source 1305.

If extreme amplitudes 1306 are present in the spectral data, the extreme amplitude frequency can be compared to a bump test 1307. A bump test is an analytic method in which the machine is monitored continuously during an impact event caused by the analyst. Frequencies that appear in a bump test indicate resonant frequencies inherent in the machine. If the extreme amplitude frequency matches a frequency from the bump test, this indicates resonance 1308. Otherwise, the cause is likely from looseness of components in the machine 1309.

If amplitudes are not extreme, the low-resolution spectrum is analyzed for random energy 1310. Anything that excites the system without regular intervals will create random energy. Common sources are dry bearings 1311 which will rub, cavitation/turbulence 1312 in a pump, or a rub condition 1313 depending on the machine details 1303. For example, cavitation 1312 is the vaporization of fluid in a pump due to low pressure and can only be present in a machine that pumps liquid, which rules this source out for other machinery.

If the spectrum shows periodic faults 1310, the peaks are compared to the running speed of the shaft. If the peaks are not integer multiples of the shaft (e.g. twice or three times exactly), they are said to be 'non-synchronous' 1314.

Figure 13B:
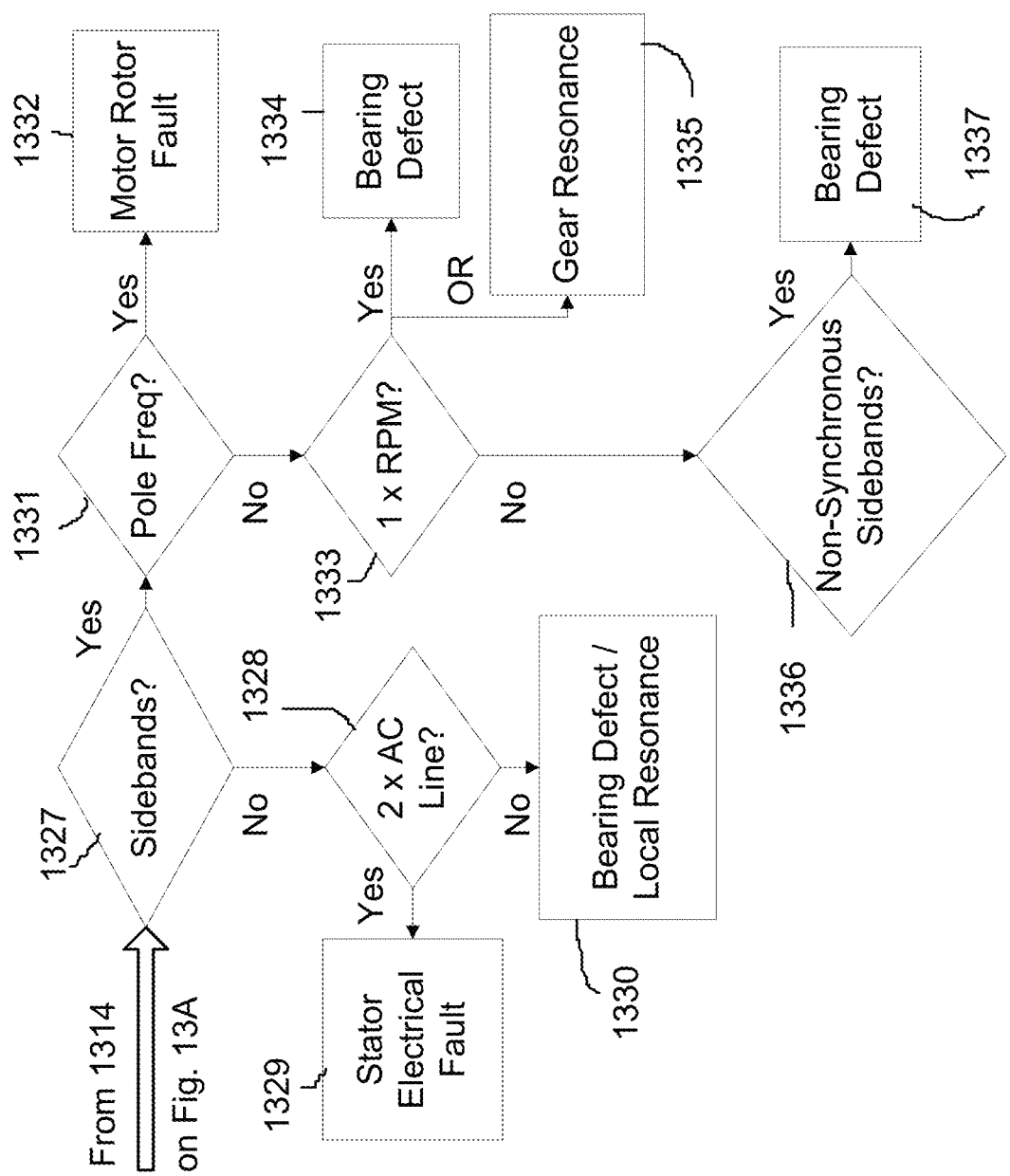
FIG. 13B shows the process for malfunction detection of rotating equipment exhibiting non-synchronous periodic signals using signal analysis.
Figure 13C:
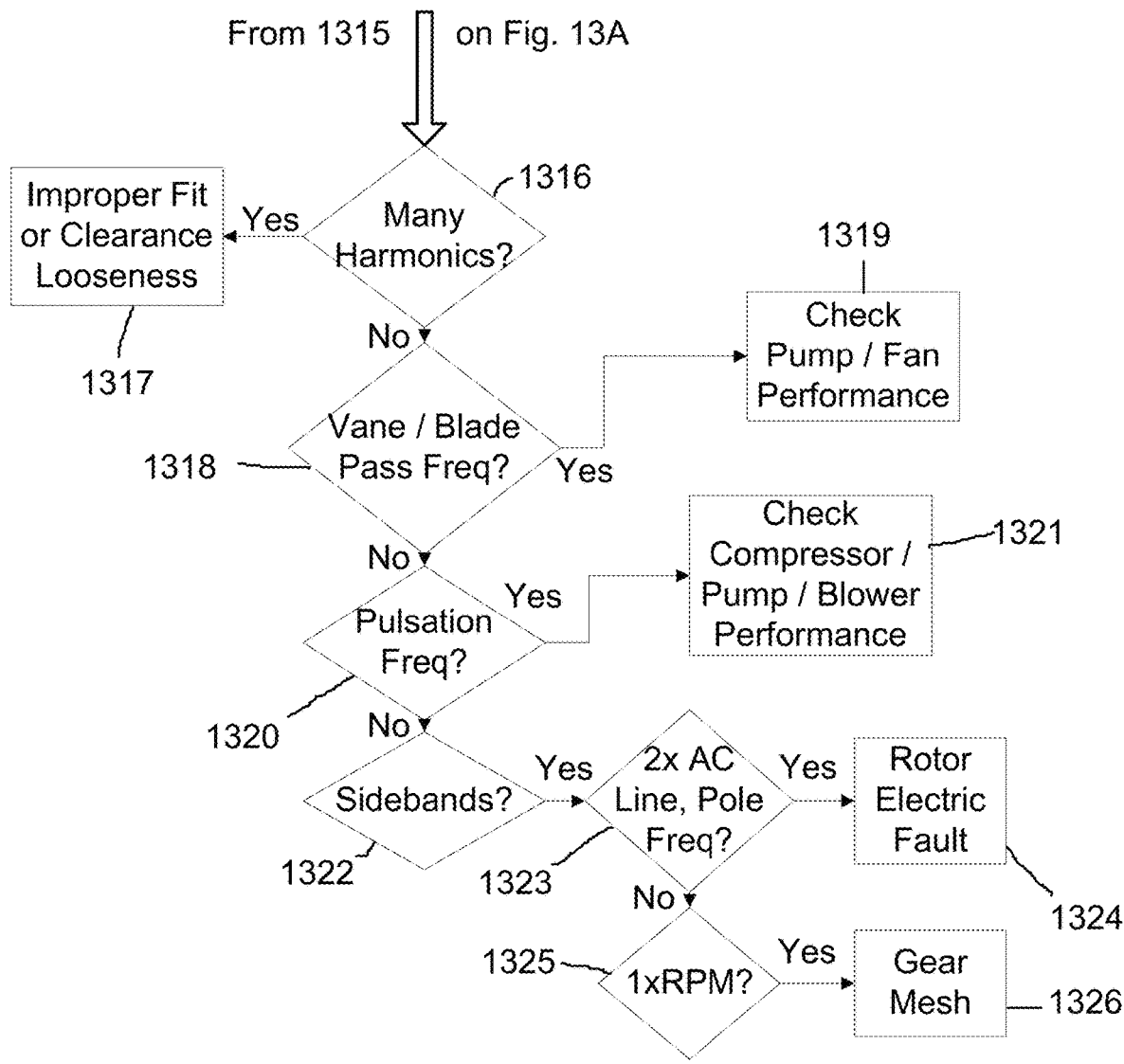
FIG. 13C shows the process for malfunction detection of rotating equipment exhibiting multiple synchronous, periodic signals using signal analysis.

Further referring to FIG. 13A and FIG. 13B, non-synchronous peaks are analyzed for the presence of sidebands 1327. Sidebands are a phenomenon resulting from the Fast Fourier Transform 608 which occur when a periodic vibration is 'modulating', or changing in amplitude or frequency at some rate. When this occurs, the modulating vibration which is called a 'carrier' frequency will appear with frequencies of smaller amplitude evenly spaced to either side. The distance at which these sideband' frequencies sit is equal to the frequency that the carrier frequency is modulating. For example, a 3600 cpm vibration which is pulsing stronger then weaker every second will appear as a high peak at 3600 cpm and small peaks 60 cpm to both sides of it. Sometimes, only one sideband may be present on a peak depending on the shape of modulation.

If sidebands are present on a non-synchronous peak 1327, the difference in frequency between the sidebands and the non-synchronous peak is compared to machine details 1303. If the sidebands have a frequency difference equal to the pole pass frequency 1331, this indicates a fault in the motor 1332. Shafts in AC motors will always rotate slightly slower that the magnetic field creating the rotation. As a result, the poles of the motor will slip by the rotor at a frequency called 'pole pass' and modulation at pole pass results from damage to this system. If the sidebands have a frequency difference equal to the running speed of the shaft 1333, this indicates a bearing defect 1334 or gear resonance 1335. These defects modulate at running speed because the defect will pass in and out of the loaded region of the shaft once per revolution. To differentiate between bearing defect 1334 and gear resonance 1335, the absence of a gearbox in the machine details 1303 will rule out gear resonance 1335. If the sidebands have a frequency difference which is not pole pass frequency 1331 or running speed 1333 or an integer multiple of running speed, they are considered non-synchronous 1336 and indicate a bearing defect 1337.

If no sidebands are present, the non-synchronous peak is checked against the machine details 1303 of alternating current (AC) line frequency 1328. Since alternating current is a sinusoidal signal, there are two peaks per cycle and problems related to it create signals related to twice that line frequency, or '2×LF'. If the peak frequency is at 2×LF, it is indicative of a stator fault in the motor 1329. If the peak does not match 2×LF, the likely fault is a bearing defect or resonant component in the machine 1330.

If the spectral data is all synchronous 1314, but contains more peaks than 1× and 2× running speed 1315, the spectrum is checked for many harmonics 1316 which are caused by impacting. Often, impacting indicates improper fit or clearance looseness 1317 somewhere in the machine. If the vane or blade pass frequency is present 1318 this indicates a fault in the fan or pump performance 1319. The vane or blade pass frequency is an integer multiple of shaft running speed multiplied by the number of vanes or blades in the pump or fan respectively in the machine details 1303. If pulsation frequency is present 1320, indicated in the machine details 1303, it indicates a fault in the compressor, pump or blower performance 1321. Likewise, the machine details 1303 will specify which component is present in the assembly. Pulsation, like vane pass, comes from the number of lobes or turns in a machine that moves fluid.

If the synchronous peak is not a running speed harmonic 1316, vane/blade pass 1318, or a pulsation frequency 1320, it is checked for sidebands 1322. If the sidebands have a frequency difference equal to 2×LF or pole pass frequency 1323, it indicates a rotor electrical fault 1324 since these frequencies are caused by electrical components. If the sidebands have a frequency difference equal to the running speed of the shaft 1325, it indicates a gear mesh fault 1326 which will modulate with running speed as the fault moves in and out of the loaded region once per revolution.

Figure 13D:
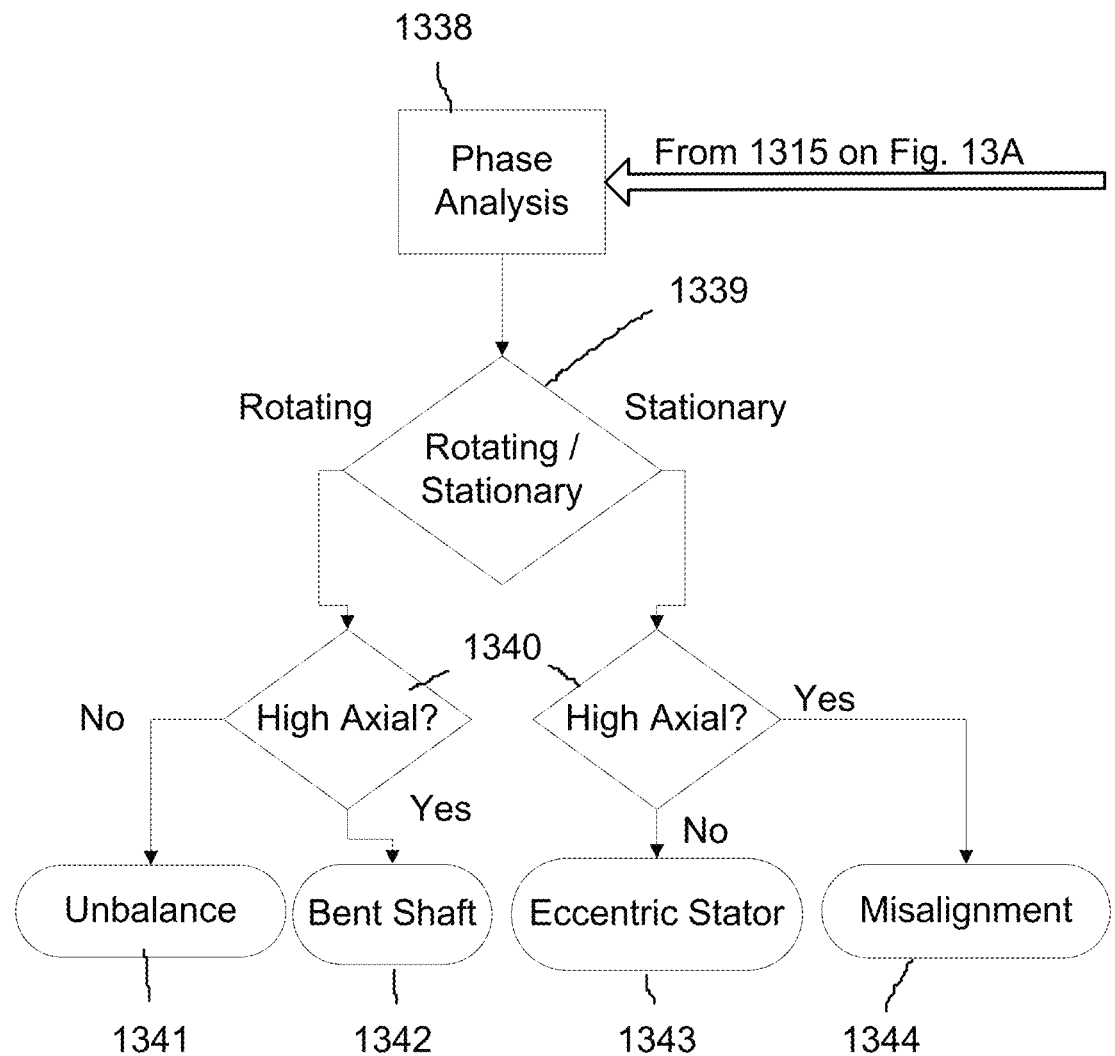
FIG. 13D shows the process for malfunction detection of rotating equipment exhibiting only 1× and 2× running speed frequency vibration using signal analysis.

Further referring to FIG. 13A and FIG. 13D; If the spectral data show only 1× and 2× running speed peaks 1315, phase analysis is performed 1338 to determine the type of force acting on the machine. Phase analysis is the collection of vibration readings, which is filtered to only the running speed frequency. The phases and directionalities of the vibrations in the horizontal, vertical and axial direction of each component in a machine are compared. Phase analysis will indicate whether a force is rotating with the shaft or acting in a single stationary direction 1339. An analyst and will also measure the axial vibration amplitudes 1340. A rotating force with low axial vibration indicates an unbalance 1341 because the unbalanced weight will rotate with the shaft generating a radial force but will not create a force axially. A rotating force with high axial vibration indicates a bent shaft 1342, which will pull on the coupling as well as create force axially as the bend attempts to 'straighten out'. A stationary force with low axial vibration indicates an eccentric stator 1343, a condition when the motor stator housing becomes warped—typically due to the motor feet being out of plane with one another (a.k.a. soft foot)—and the gap between the stationary stator and the rotating rotor is uneven. This uneven gap does not change radial location and does not affect the axial forces. A stationary force with high axial vibration indicates a misalignment 1344, which will create a radial force in the plane of the misalignment of two shafts and create axial force as the machine components pull and push each-other across the coupling to correct the alignment.

Figure 14:
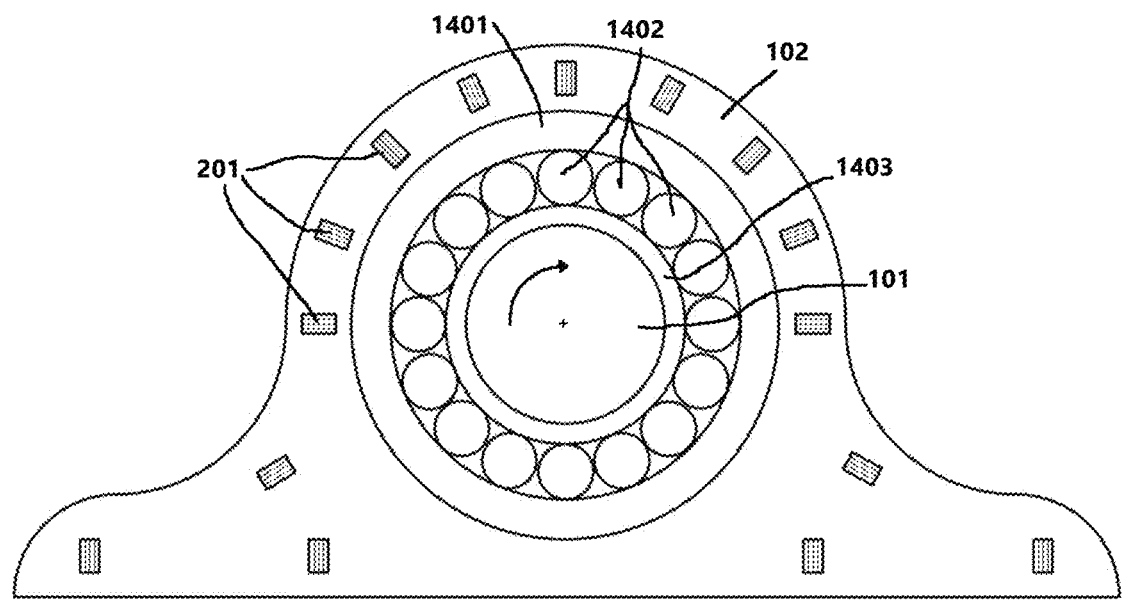
FIG. 14 shows an axial view of strain gages applied to a rolling element bearing for measuring strain in any direction or location.

FIG. 14 shows an axial view of a rolling element bearing with strain gages 201 applied radially and otherwise to the bearing housing 102. As vibrations can transmit through a rolling element bearing in the same fashion as a fluid film bearing 100, strain detection can be used to diagnose malfunctions for these bearings as well. Rather than suspending the rotating shaft 101 with a fluid, a rolling element bearing interfaces with the shaft through the inner race 1403 which will spin freely in the bearing center. Rolling elements 1402 hold the inner race 1403 and spin between it and the outer race 1401 to secure the shaft with low friction. The outer race is fitted into a bearing housing 102, which is normally a part of the machine casing. The rolling elements 1402 have natural frequencies and turning rates, which can be found in the machine details 1303 which allow for their malfunctions to be detected through strain data.

In further embodiments, a strain gage based transducer and measurement system can be used to monitor the health of rolling element bearings. Prior art condition monitoring sensors such as accelerometers, proximity probes, and RTDs (resistance temperature detectors) are not well suited for these applications. Common examples of rolling element bearing applications include fans, compressors, motors, pumps, small turbines, gearboxes, and blowers.

Figure 15:
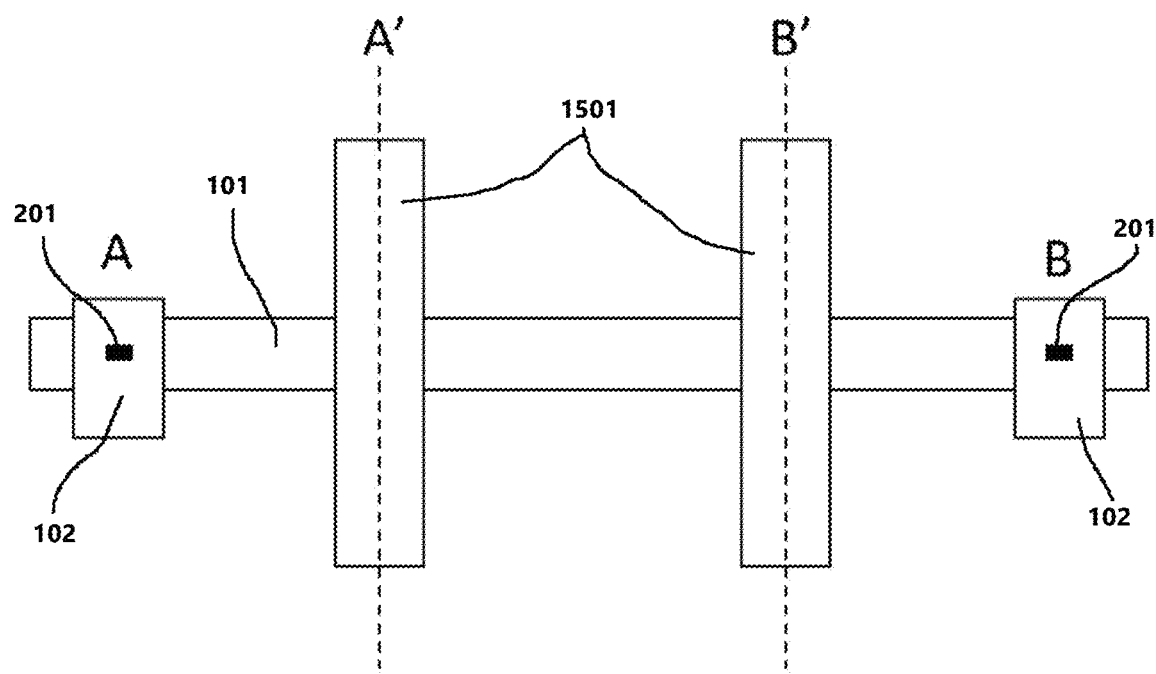
FIG. 15 shows a horizontal view of a machine rotor center-hung between two fluid film bearings fitted with strain gages for balancing.

In addition to condition monitoring and failure detection of fluid film bearings, another field of use for embodiments of the strain measurement system and method is the use of dynamically sampled strain gage measurements to perform dynamic balancing of rotor assemblies supported by fluid film bearings. FIG. 15 shows a horizontal view of a rotor hung in the center of two fluid film bearings 100 with applied strain gages 201 labelled A and B. The middle of the rotating shaft 101 has two rotor wheels 1501, labelled A' and B', which can have weight added or removed to balance the rotor. During balancing, amplitude readings are taken at the bearings 100 and iterative corrections are made by adding or removing weight at the rotor wheels 1501 until amplitudes are below a chosen limit.

Strain gages 201 are significant in the balancing of rotors using fluid film bearings 100 due to the non-linear nature of the fluid and how it transmits force. Using accelerometers, an analyst must interpret how the force is being affected with each correction based on the motion of the bearing. In a non-linear system, this becomes a difficult mathematical process and the calculated forces are a function of many inexact variables. When using strain readings, changes in force can be solved for directly and easily with no affect from the fluid film on the math.

Figure 16A:
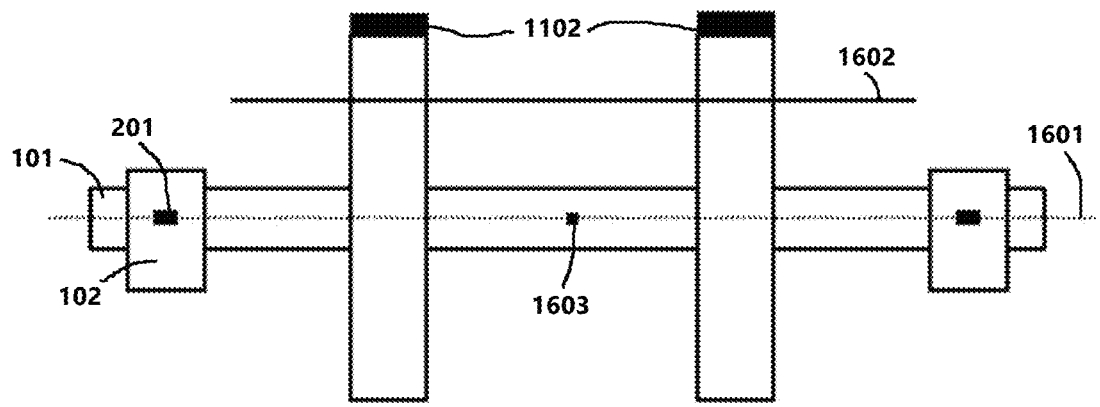
FIG. 16A shows a machine rotor exhibiting a static unbalance condition.

FIG. 16A shows a horizontal view of a rotor between two fluid film bearings 100 fitted with strain gages 201. The rotor has equal unbalanced weight, or heavy spot 1102, at radial and angular locations equal between both planes. The resulting center of rotation 1602, the axis the rotor would naturally rotate about if it was free, is parallel with the shaft centerline 1601 and center of gravity 1603, but displaced toward the unbalance. This condition is called static unbalance. As the rotating shaft 101 turns, this unbalance will create a rotating force on the bearings 100, causing wear and high amplitude vibrations.

Figure 16B:
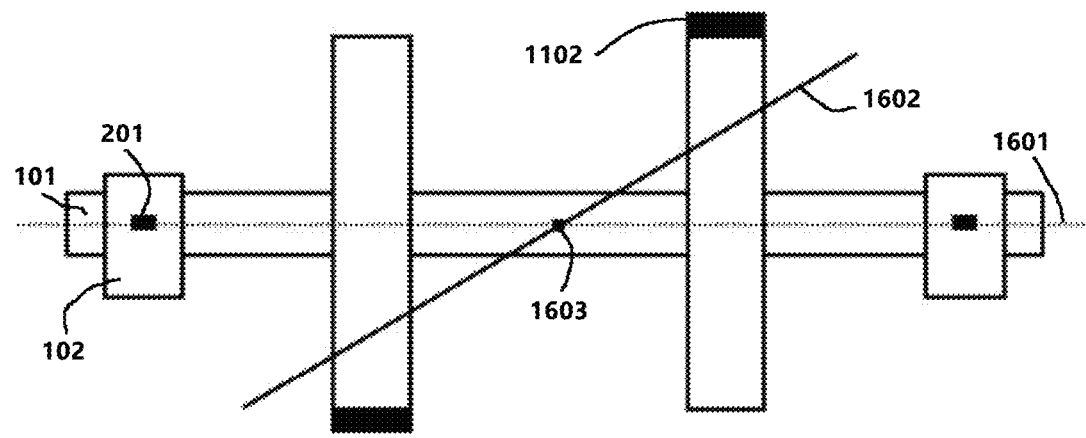
FIG. 16B shows a machine rotor exhibiting a couple unbalance condition.

FIG. 16B shows a horizontal view of a rotor between two fluid film bearings 100 fitted with strain gages 201. The rotor has equal unbalanced heavy spots 1102 equidistant from shaft centerline at directly opposite angles (180 degrees). The resulting center of rotation 1602 passes through the center of gravity 1603 but is not parallel with the shaft centerline 1601. This condition is called couple unbalance. As the rotating shaft 101 turns, this unbalance will create a rotating force on the bearings 100, causing wear and high amplitude vibrations.

Figure 16C:
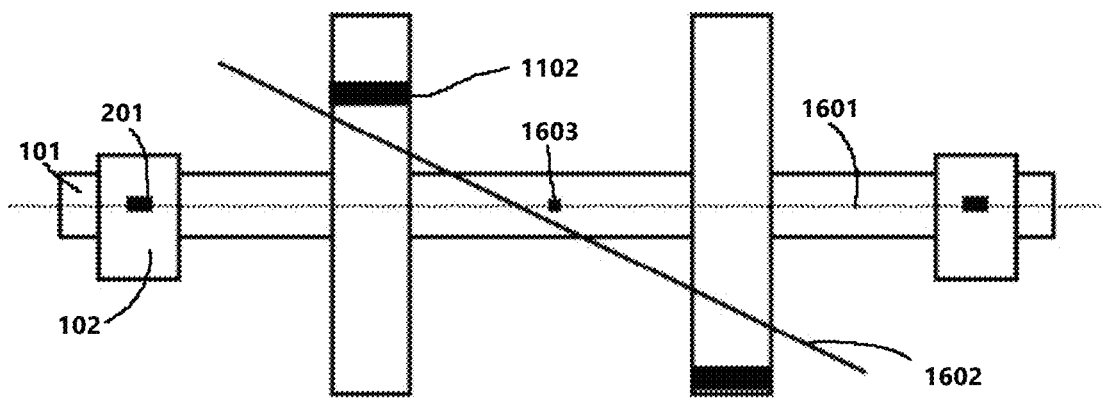
FIG. 16C shows a machine rotor exhibiting a dynamic unbalance condition.

FIG. 16C shows a horizontal view of a rotor between two fluid film bearings 100 fitted with strain gages 201. The rotor has unequal heavy spots 1102 at different radial and angular locations. The resulting center of rotation 1602 is not parallel with the shaft centerline 1601 and does not pass through the center of gravity. 1603 This condition is called dynamic unbalance. As the rotating shaft 101 turns, this unbalance will create a rotating force on the bearings 100, causing wear and high amplitude vibrations.

FIG. 17A and FIG. 17B show two alternative signal conditioning systems that generate an equivalent current-based signal. FIG. 17A illustrates a signal conditioning circuit which reads bridge resistances from a piezoresistive strain gage sensor, AKA a Wheatstone Bridge circuit 604 and generates a dynamic current-based conditioned signal. FIG. 17B illustrates a signal conditioning circuit which produces a voltage-based signal from the same Wheatstone Bridge sensor 604 and generates a voltage-based output. This voltage-based conditioned signal is then converted by a voltage-to-current circuit to create the final current-based conditioned signal. Current-based signals are desirable if a signal will travel long distances, as voltage-based signals attenuate after some length of conductor.

Embodiments of the strain measurement method and system can be permanently installed on a piece of equipment and wired into the main control system of a plant. The system and method could also comprise strain measurement instruments that are interconnected wirelessly. The strain measurement instruments or nodes could communicate as nodes in a network configuration using a protocol capable of being understood by anyone skilled in the art, including the use of an internet protocol. The strain measurement system and/or method can output an overall value corresponding to the sum of all strains present at each point in the system. The strain gages can be sampled dynamically and then converted to the frequency domain to identify faults. More specifically:

1. The strain gage voltages can be sampled at 100 kHz with a 24-bit analog-digital converter;
2. The time domain signals can be analyzed to quantify RMS (root mean square), peak, and other typical quantities of vibration;
3. A Fast Fourier Transform (FFT) of the time domain signals can be performed, with as many lines of resolution as necessary, to resolve vibration frequencies;
4. Frequencies from the FFT can be identified and used to establish alarm limits of vibration; and
5. The amplitudes of frequencies of interest can be trended and correlated to fluid film bearing wear and overall health of the fluid film bearing.

There can be multiple methods for manufacturing embodiments of the present invention. In one method, the strain gage sensor or sensors sit on the outer circumference of the babbitt. This could have the form and manufacturing methods used to produce custom load cells. In an alternate manufacturing method, an array of strain gauges is placed on the bearing surface prior to the Babbitt material being cast. This alternate manufacturing method would allow the strain gauges to be embedded during the casting process. A third manufacturing method would be to install strain gauges on the bearing housing assembly.

The system and method described in the present application can be implemented as a device or as a service. If implemented as a service, a provider can install the strain gage or gages, receive the signals from the strain gage or gages, and or process the signals. The results of the processed signals can be provided to the client as data or as alarms.

Embodiments of the strain measurement system and method described here can be used on various types of industrial and non-industrial equipment. Examples include, but are not limited to, AC induction motors, DC motors, steam turbines, centrifugal compressors, centrifugal fans, centrifugal blowers, centrifugal pumps, gearboxes, conveyors, reciprocating compressors, and reciprocating engines. The types of bearings to which embodiments of the strain measurement system and method can be applied to include radial bearings, thrust bearings, crank bearings, rod bearings, foil bearings, and air bearings. These bearing applications can be used in a hydrodynamic or a hydrostatic configuration. Common bearing designs include; plain sleeve bearings, flexure pad bearings, pressure fed sleeve bearings, oil ring lubricated, multi-lobe bearings, lemon-bore bearings, offset half bearings, pressure dam bearings, and tilt pad bearings. The lubricating fluid utilized in fluid film bearings include but are not limited to; oil, grease, air, gas, water, and various process fluids such as drilling mud used when drilling for oil or gas.

A further number of variations and modifications of the disclosed embodiments can also be used. While the principles of the disclosure have been described above in connection with specific apparatuses and methods, it is to be clearly understood that this description is made only by way of example and not as limitation on the scope of the disclosure.

We claim:

1. A rotating machine measurement system comprising:
a strain transducer attached to a journal bearing housing in the rotating machine wherein:
the strain transducer receives an electrical excitation;
the strain transducer generates an electrically measurable output in response to a change of a force in at least a part of the journal bearing housing;
the strain transducer comprises at least two strain measurement elements; and
a Wheatstone bridge circuit that produces a time varying analog electrical signal in response to the electrically measurable output of the strain transducer;
an analog to digital converter that generates a time varying digital electrical signal in response to the time varying analog electrical signal; and
an analyzer configured for determining a malfunction of the rotating machine in response to the time-varying digital signal.

2. The system of claim 1 wherein:
the analyzer is configured for generating an output in response to the time-varying digital signal wherein the output is selected from the group of:
a Bode plot;
a polar plot;
a load path plot;
a peak amplitude signal;
a root-mean-squared signal;
a crest factor signal; and
a frequency domain signal in response to a digital Fourier transform.

3. The system of claim 1 wherein:
the system is configured for detecting a malfunction selected from the group of:
an oil whirl in a fluid film bearing;
an unbalance;
a collision of a rotating shaft onto a babbitt; and
a motor stator fault.

4. The system of claim 1 wherein:
the first strain measurement element and the second strain measurement element comprise devices selected from the group of a metallic foil strain gage, a piezoelectric strain sensor, and a piezoresistive strain sensor; and
the time-varying analog electrical signal from the Wheatstone bridge circuit is responsive to the first strain measurement element and the second strain measurement element.

5. The system of claim 4 wherein:
the first strain measurement element is responsive to a first force in the journal bearing housing;
the second strain measurement element is responsive to a second force in the journal bearing housing; and
the direction of the first force is perpendicular to the direction of the second force.

6. The system of claim 1 wherein:
the analyzer is configured for generating a frequency domain signal in response to a digital Fourier transform of the time-varying digital signal;
the system is configured for detecting a failure selected from the group of:
a motor malfunction;
a bearing malfunction;
a gear malfunction;
a pump malfunction;
a fan malfunction;
a shaft and bearing fit malfunction;
a machine unbalance; and
a shaft misalignment.

7. A strain gage based rotating machine measurement system comprising:
a first strain gage attached to a journal bearing housing wherein:
the first strain gage receives an electrical excitation; and
the first strain gage generates a first electrically measurable output in response to a change of a first force in at least a part of the journal bearing housing; and
a Wheatstone bridge circuit that produces a first time varying analog electrical signal in response to the first electrically measurable output of the first strain gage;
an analog to digital converter that generates a first time varying digital electrical signal in response to the first time varying analog electrical signal; and
an analyzer configured for determining a mechanical condition of the rotating machine in response to the first time-varying digital signal.

8. The system of claim 7 wherein:
the strain gage comprises a device selected from the group of a metallic foil strain gage, a piezoelectric strain sensor, and a piezoresistive strain sensor;
the system comprises a second strain gage wherein:
the second strain gage is attached to the journal bearing housing;
the second strain gage generates a second electrically measurable output in response to a change of a second force in at least part of the journal bearing housing;
the analyzer is configured for determining the mechanical condition of the rotating machine in response to the first time-varying digital signal and the second electrically measurable output.

9. The system of claim 7 wherein:
the system is configured to generate an output electrical current in response to a change of the first force.

10. The system of claim 7 wherein:
the mechanical condition is a balance condition of the rotating machine; and
the system is configured to improve the balance of a rotor in the rotating machine in response to the mechanical condition information.

11. The system of claim 7 wherein:
the analyzer is configured for determining the phase angle of a sinusoidal signal; and
the system is configured for determining a shaft misalignment.

12. The system of claim 7 wherein:
the analyzer is configured for determining the frequency of a sinusoidal signal; and
the system is configured for determining the existence of a resonant vibration in the rotating machine.

13. The system of claim 7 wherein:
the analyzer is configured for determining the phase angle of a sinusoidal signal; and
the system is configured for determining the existence of a bent shaft in the rotating machine.

14. The system of claim 7 wherein:
the analyzer is configured for determining the phase angle of a sinusoidal signal; and
the system is configured for determining the existence of an eccentric stator in the rotating machine.

15. The system of claim 7 wherein:
the mechanical condition is a defect in a gear in the rotating machine.

16. The system of claim 7 wherein:
the analyzer is configured for determining the frequency spectrum of the first force; and
the mechanical condition is a performance issue of a device selected from the group of a centrifugal pump, a fan, and a compressor.

17. The system of claim 7 wherein:
the mechanical condition is a malfunction within a fluid film bearing that could lead to failure wherein the malfunction is selected from the group of:
improper lubrication;
improper preload; and
an unstable oil wedge.

18. A method for measuring a rotating machine, the method comprising the steps of:
mounting a strain transducer on a journal bearing housing;
using the strain transducer and a Wheatstone bridge circuit to measure time-varying changes of a force in at least part of the journal bearing housing;
digitizing the time varying force measurement to produce a time varying digital signal; and
analyzing the time-varying digital signal to determine a malfunction of the rotating machine.

19. The method of claim 18 wherein:
analyzing the time-varying digital signal comprises a frequency spectrum analysis.

20. The method of claim 18 wherein:
analyzing the time-varying digital signal comprises a phase analysis.

* * * * *